(12) United States Patent
Hannuksela et al.

(10) Patent No.: US 11,653,054 B2
(45) Date of Patent: May 16, 2023

(54) METHOD AND APPARATUS FOR LATE BINDING IN MEDIA CONTENT

(71) Applicant: Nokia Technologies Oy, Espoo (FI)

(72) Inventors: Miska Matias Hannuksela, Tampere (FI); Emre Baris Aksu, Tampere (FI); Ari Hourunranta, Tampere (FI); Kashyap Kammachi-Sreedhar, Tampere (FI); Igor Danilo Diego Curcio, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/433,075

(22) PCT Filed: Dec. 12, 2019

(86) PCT No.: PCT/FI2019/050887
§ 371 (c)(1),
(2) Date: Aug. 23, 2021

(87) PCT Pub. No.: WO2020/183053
PCT Pub. Date: Sep. 17, 2020

(65) Prior Publication Data
US 2022/0167042 A1    May 26, 2022

Related U.S. Application Data

(60) Provisional application No. 62/818,418, filed on Mar. 14, 2019.

(51) Int. Cl.
*H04N 21/435* (2011.01)
*H04L 65/70* (2022.01)
(Continued)

(52) U.S. Cl.
CPC ........... *H04N 21/435* (2013.01); *H04L 65/70* (2022.05); *H04L 65/762* (2022.05); *H04N 21/845* (2013.01)

(58) Field of Classification Search
CPC .. H04N 21/435; H04N 21/845; H04N 19/597; H04N 21/8456; H04N 21/26258;
(Continued)

(56) References Cited

U.S. PATENT DOCUMENTS

2015/0026358 A1    1/2015   Zhang et al.
2015/0063505 A1*   3/2015   Kim .................. H04N 21/23614
2016/0182593 A1    6/2016   Denoual et al.

FOREIGN PATENT DOCUMENTS

CN    102761524 A    10/2012
CN    103069492 A    4/2013
(Continued)

OTHER PUBLICATIONS

"Information Technology—Coding Of Audio-Visual Objects—Part 15: Advanced Video Coding (AVC) File Format", ISO/IEC 14496-15, First edition, Apr. 15, 2004, 29 pages.
(Continued)

*Primary Examiner* — Anthony Bantamoi
(74) *Attorney, Agent, or Firm* — Harrington & Smith

(57) ABSTRACT

A method, apparatus and computer program product encode, into a media description, a first information item indicative of a first locator for segment metadata for a set of representations. The method, apparatus and computer program product encode, into the media description, one or more representation-specific information items indicative of representation-specific locator for segment media data for one or more representations of the set of representations. The method, apparatus and computer program product cause storage of the media description with the set of representations.

20 Claims, 18 Drawing Sheets

(51) Int. Cl.
*H04L 65/75* (2022.01)
*H04N 21/845* (2011.01)

(58) Field of Classification Search
CPC .. H04N 19/167; H04N 19/70; H04N 21/4728; H04L 65/70; H04L 65/762
See application file for complete search history.

(56) References Cited

FOREIGN PATENT DOCUMENTS

| CN | 103858440 A | 6/2014 |
|---|---|---|
| CN | 105230024 A | 1/2016 |
| CN | 107888939 A | 4/2018 |
| JP | 2014529970 A | 11/2014 |
| JP | 2016522622 A | 7/2016 |
| JP | 2017139628 A | 8/2017 |
| WO | 2013/033565 A1 | 3/2013 |
| WO | WO-2015/010056 A1 | 1/2015 |
| WO | 2017/140939 A1 | 8/2017 |
| WO | WO-2018/038523 A1 | 3/2018 |
| WO | 2020/008115 A1 | 1/2020 |

OTHER PUBLICATIONS

"Advanced Video Coding For Generic Audiovisual services", Series H: Audiovisual And Multimedia Systems, Infrastructure of audio-visual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

Koenen, "Profiles under Considerations for version 2 of ISO/IEC 23090-2 Omnidirectional Media Format", Systems and Requirements, ISO/IEC JTC1/SC29/WG11/N18235, Jan. 2019, 14 pages.

Podborski et al., "[DASH][OMAF] On 'ssix' for tile-based streaming", Fraunhofer HHI, ISO/IEC JTC1/SC29/WG11 MPEG2018 / m44621, Oct. 2018, 6 pages.

"Versatile Video Coding", Series H: Audiovisual and Multimedia Systems Infrastructure of audiovisual services—Coding of moving video, Recommendation ITU-T H.266, Aug. 2020, 516 pages.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

"Information technology—MPEG systems technologies—Part 14: Partial file format (Partial File Format)", ISO/IEC FDIS 23001-11, Apr. 26, 2013, 24 Pages.

"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.

"Information Technology—Dynamic Adaptive Streaming over HTTP (DASH)—Part 1: Media Presentation Description and Segment Formats", ISO/IEC 23009-1, Second Edition, May 15, 2014, 152 pages.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.1.0, Dec. 2018, pp. 1-138.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

International Search Report and Written Opinion received for corresponding Patent Cooperation Treaty Application No. PCT/FI2019/050887, dated Apr. 14, 2020, 17 pages.

Van Brandenburg, Ray, et al., Late Binding in Tiled Streaming Explained, Tiledmedia, ISO/IEC JTC1/SC29/WG11 MPEG2018/n42942, Jul. 2018, 4 pages.

"Information technology—Dynamic adaptive streaming over HTTP (DASH)—Part 3: Implementation guidelines", ISO/IEC TR 23009-3:201x(E), Jan. 2018, 104 pages.

* cited by examiner

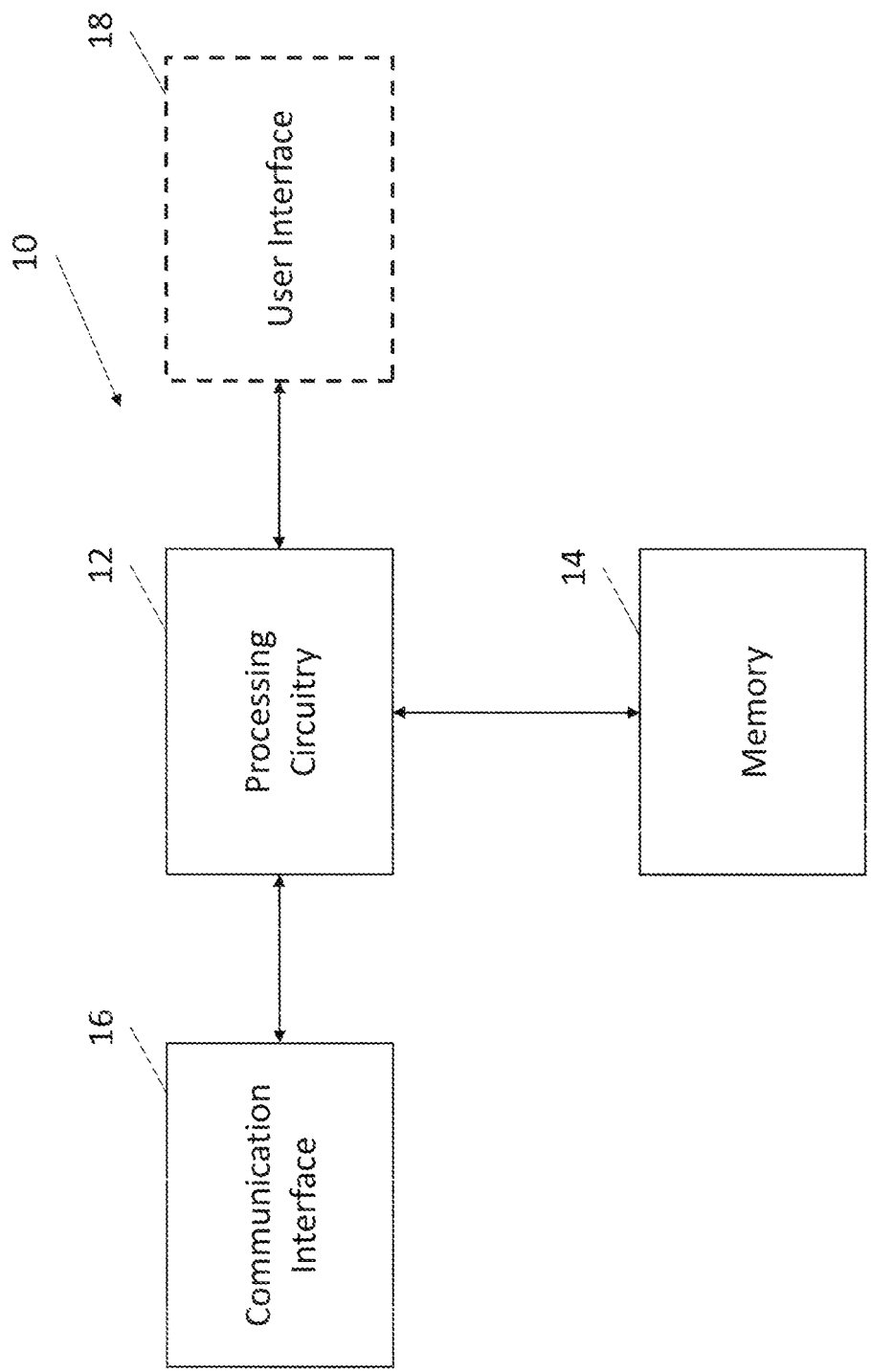

Figure 10B

METHOD AND APPARATUS FOR LATE BINDING IN MEDIA CONTENT

RELATED APPLICATION

This application claims priority to PCT Application No. PCT/FI2019/050887, filed on Dec. 12, 2019, which claims priority to U.S. Application No. 62/818418, filed on Mar. 14, 2019, each of which is incorporated herein by reference in its entirety.

TECHNICAL FIELD

An example embodiment relates generally to video encoding and decoding.

BACKGROUND

Video content nowadays is played by various internet video devices such as phones, tablets, game consoles, and connected televisions in a wide range of bitrates, resolutions, languages, etc. that reflect the variety of devices, networks, and the global reach of the internet. Therefore, video coding has evolved into adaptive media formats that allows each device to select and combine media objects, such as audio and video tracks, and movie fragments of video at a bitrate and resolution optimized for the device and the network resources available for the device. Therefore, late binding of independently created and/or delivered tracks for combined playback is preferred. In other words, media components' segments may need to be separately delivered and combined at the time of playback.

To realize such late binding efficiently, media content may need to be made available in a manner that makes it possible to fetch all the movie fragment headers of all available tracks with one request per (Sub) segment. Availability of the movie fragment headers in the client greatly reduces latency introduced by quality switching. A media segment may be used for delivery, such as streaming, e.g., in MPEG-Dynamic Adaptive Streaming over Hypertext Transfer Protocol (HTTP) (MPEG-DASH). However, currently, there is no late binding solution fully compatible with MPEG-DASH.

BRIEF SUMMARY

A method, apparatus and computer program product are provided in accordance with an example embodiment to provide a mechanism for late binding in video encoding. The method, apparatus and computer program product may be utilized in conjunction with a variety of video formats.

In one example embodiment, a method is provided that includes encoding, into a media description, a first information item indicative of a first locator for segment metadata for a set of representations. The method further includes encoding, into the media description, one or more representation-specific information items indicative of a representation-specific locator for segment media data for one or more representations of the set of representations. The method further includes causing storage of the media description with the set of representations.

In some implementations of such a method, the first information item comprises information identifying one or more index segments for one or more media segments and the one or more index segments describe one or more segments of a collection of tracks. In some embodiments, the segment metadata comprises one or more movie fragment headers.

In another example embodiment, a method is provided that includes receiving information indicating that byte offsets in segment or subsegment metadata to segment or subsegment media data are relative to a box containing the segment or subsegment media data. The method further includes receiving the segment or subsegment metadata for a collection of tracks. The method further includes determining a locator for segment or subsegment media data. The method further includes selecting a subset of tracks from the collection of tracks. The method further includes receiving segment or subsegment media data for the selected subset of tracks through request with the locator. The method further includes parsing the segment or subsegment metadata of the subset of tracks to obtain decapsulated media data suitable for decoding the segment or subsegment media data.

In another example embodiment, a method is provided that includes receiving a file or an initialization segment and one or more media segments with one or more tile tracks. The method further includes encoding the one or more tile tracks in a representation. The method further includes separating segment metadata and segment media data associated with the one or more media segments to separate parts of each of the one or more media segment. The method further includes ordering the segment metadata in subsegment-interleaved order within each of the one or more media segments.

In another example embodiment, an apparatus is provided that includes processing circuitry and at least one memory including computer program code for one or more programs with the at least one memory and the computer program code configured to, with the processing circuitry, cause the apparatus at least to encode, into a media description, a first information item indicative of a first locator for segment metadata for a set of representations. The computer program code is further configured to, with the at least one processor, cause the apparatus to encode, into the media description, one or more representation-specific information items indicative of a representation-specific locator for segment media data for one or more representations of the set of representations. The computer program code is further configured to, with the at least one processor, cause the apparatus to cause storage of the media description with the set of representations.

In some implementations of such an apparatus, the first information item comprises information identifying one or more index segments for one or more media segments and the one or more index segments describe one or more segments of a collection of tracks. In some embodiments, the segment metadata comprises one or more movie fragment headers.

In another example embodiment, an apparatus is provided that includes processing circuitry and at least one memory including computer program code for one or more programs with the at least one memory and the computer program code configured to, with the processing circuitry, cause the apparatus at least to receive information indicating that byte offsets in segment or subsegment metadata to segment or subsegment media data are relative to a box containing the segment or subsegment media data. The computer program code is further configured to, with the at least one processor, cause the apparatus to receive the segment or subsegment metadata for a collection of tracks. The computer program code is further configured to, with the at least one processor, cause the apparatus to determine a locator for segment or subsegment media data. The computer program code is further configured to, with the at least one processor, cause the apparatus to select a subset of tracks from the collection of tracks. The computer program code is further configured to, with the at least one processor, cause the apparatus to receive segment or subsegment media data for the selected subset of tracks through request with the locator. The computer program code is further configured to, with the at least one processor, cause the apparatus to parse the segment or subsegment metadata of the subset of tracks to obtain decapsulated media data suitable for decoding the segment or subsegment media data.

In another example embodiment, an apparatus is provided that includes processing circuitry and at least one memory including computer program code for one or more programs with the at least one memory and the computer program code configured to, with the processing circuitry, cause the apparatus at least to receive a file or an initialization segment and one or more media segments with one or more tile tracks. The computer program code is further configured to, with the at least one processor, cause the apparatus to encode the one or more tile tracks in a representation. The computer program code is further configured to, with the at least one processor, cause the apparatus to separate segment metadata and segment media data associated with the one or more media segments to separate parts of each of the one or more media segment. The computer program code is further configured to, with the at least one processor, cause the apparatus to order the segment metadata in subsegment-interleaved order within each of the one or more media segments.

In another example embodiment, a computer program product is provided that includes at least one non-transitory computer-readable storage medium having computer executable program code instructions stored therein with the computer executable program code instructions comprising program code instructions configured, upon execution, to encode, into a media description, a first information item indicative of a first locator for segment metadata for a set of representations. The computer executable program code instructions comprise program code instructions that are further configured, upon execution, to encode, into the media description, one or more representation-specific information items indicative of representation-specific locator for segment media data for one or more representations of the set of representations. The computer executable program code instructions comprise program code instructions that are further configured, upon execution, to cause storage of the media description with the set of representations.

In some implementations of such a computer program product, the first information item comprises information identifying one or more index segments for one or more media segments and the one or more index segments describe one or more segments of a collection of tracks. In some embodiments, the segment metadata comprises one or more movie fragment headers.

In another example embodiment, a computer program product is provided that includes at least one non-transitory computer-readable storage medium having computer executable program code instructions stored therein with the computer executable program code instructions comprising program code instructions configured, upon execution, to receive information indicating that byte offsets in segment or subsegment metadata to segment or subsegment media data are relative to a box containing the segment or subsegment media data. The computer executable program code instructions comprise program code instructions that are further configured, upon execution, to receive the segment or subsegment metadata for a collection of tracks. The computer executable program code instructions comprise program code instructions that are further configured, upon execution, to determine a locator for segment or subsegment media data. The computer executable program code instructions comprise program code instructions that are further configured, upon execution, to select a subset of tracks from the collection of tracks. The computer executable program code instructions comprise program code instructions that are further configured, upon execution, to receive segment or subsegment media data for the selected subset of tracks through request with the locator. The computer executable program code instructions comprise program code instructions that are further configured, upon execution, to parse the segment or subsegment metadata of the subset of tracks to obtain decapsulated media data suitable for decoding the segment or subsegment media data.

In another example embodiment, a computer program product is provided that includes at least one non-transitory computer-readable storage medium having computer executable program code instructions stored therein with the computer executable program code instructions comprising program code instructions configured, upon execution, to receive a file or an initialization segment and one or more media segments with one or more tile tracks. The computer executable program code instructions comprise program code instructions that are further configured, upon execution, to encode the one or more tile tracks in a representation. The computer executable program code instructions comprise program code instructions that are further configured, upon execution, to separate segment metadata and segment media data associated with the one or more media segments to separate parts of each of the one or more media segment. The computer executable program code instructions comprise program code instructions that are further configured, upon execution, to order the segment metadata in subsegment-interleaved order within each of the one or more media segments.

In another example embodiment, an apparatus is provided that includes means for encoding, into a media description, a first information item indicative of a first locator for segment metadata for a set of representations. The apparatus further includes means for encoding, into the media description, one or more representation-specific information items indicative of a representation-specific locator for segment media data for one or more representations of the set of representations. The apparatus further includes means for causing storage of the media description with the set of representations.

In some implementations of such an apparatus, the first information item comprises information identifying one or more index segments for one or more media segments and the one or more index segments describe one or more segments of a collection of tracks. In some embodiments, the segment metadata comprises one or more movie fragment headers.

In another example embodiment, an apparatus is provided that includes means for means for receiving information indicating that byte offsets in segment or subsegment metadata to segment or subsegment media data are relative to a box containing the segment or subsegment media data. The apparatus further includes means for receiving the segment or subsegment metadata for a collection of tracks. The apparatus further includes means for determining a locator for segment or subsegment media data. The apparatus further includes means for selecting a subset of tracks from the collection of tracks. The apparatus further includes means for receiving segment or subsegment media data for the selected subset of tracks through request with the locator.

The apparatus further includes means for parsing the segment or subsegment metadata of the subset of tracks to obtain decapsulated media data suitable for decoding the segment or subsegment media data. In another example embodiment, an apparatus is provided that includes means for means for receiving a file or an initialization segment and one or more media segments with one or more tile tracks. The apparatus further includes means for encoding the one or more tile tracks in a representation. The apparatus further includes means for separating segment metadata and segment media data associated with the one or more media segments to separate parts of each of the one or more media segment. The apparatus further includes means for ordering the segment metadata in subsegment-interleaved order within each of the one or more media segments.

BRIEF DESCRIPTION OF THE DRAWINGS

Figure 2A:
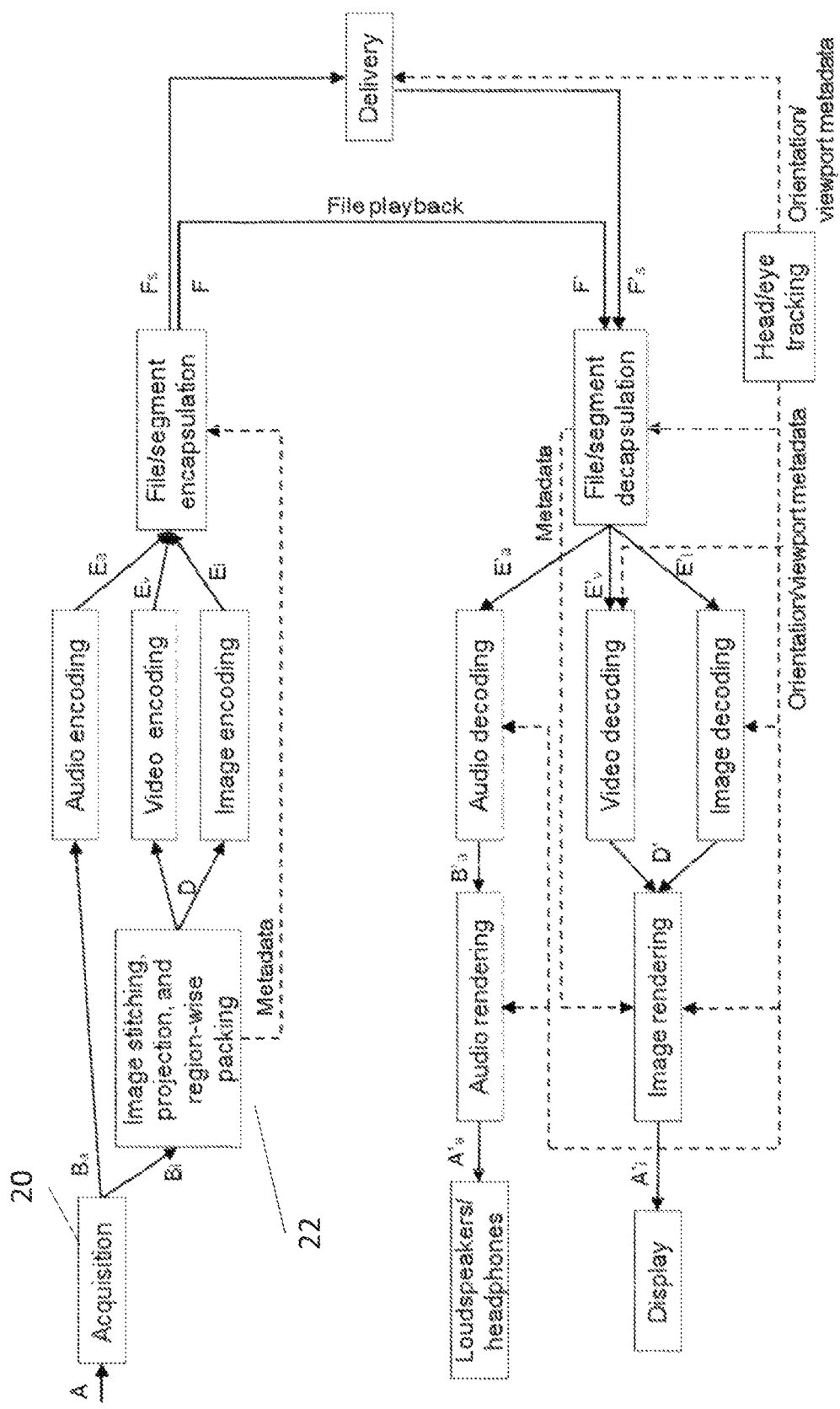
Figure 2B:
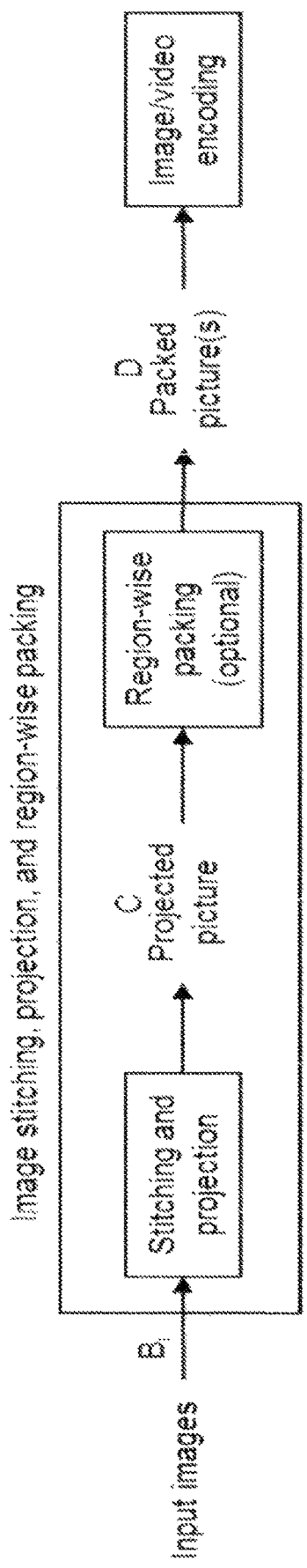
Figure 2C:
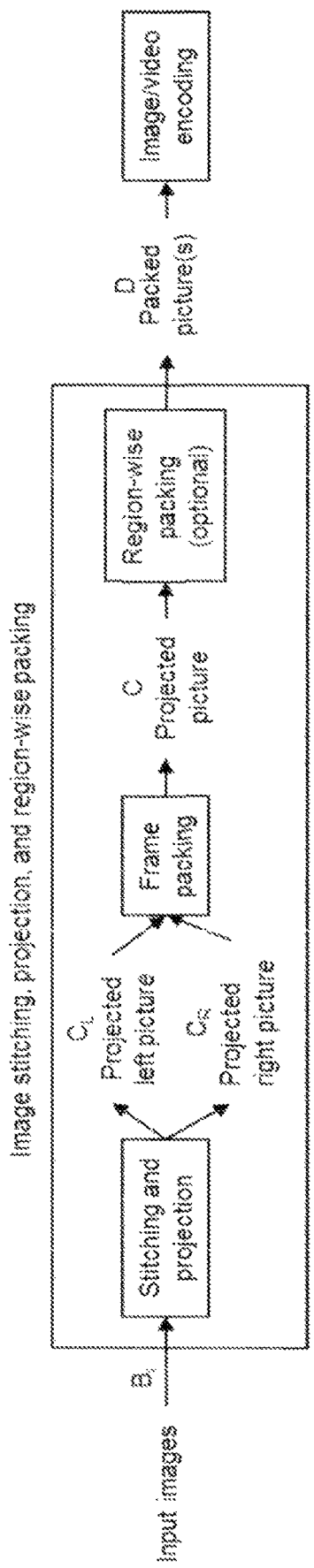
Figure 3:
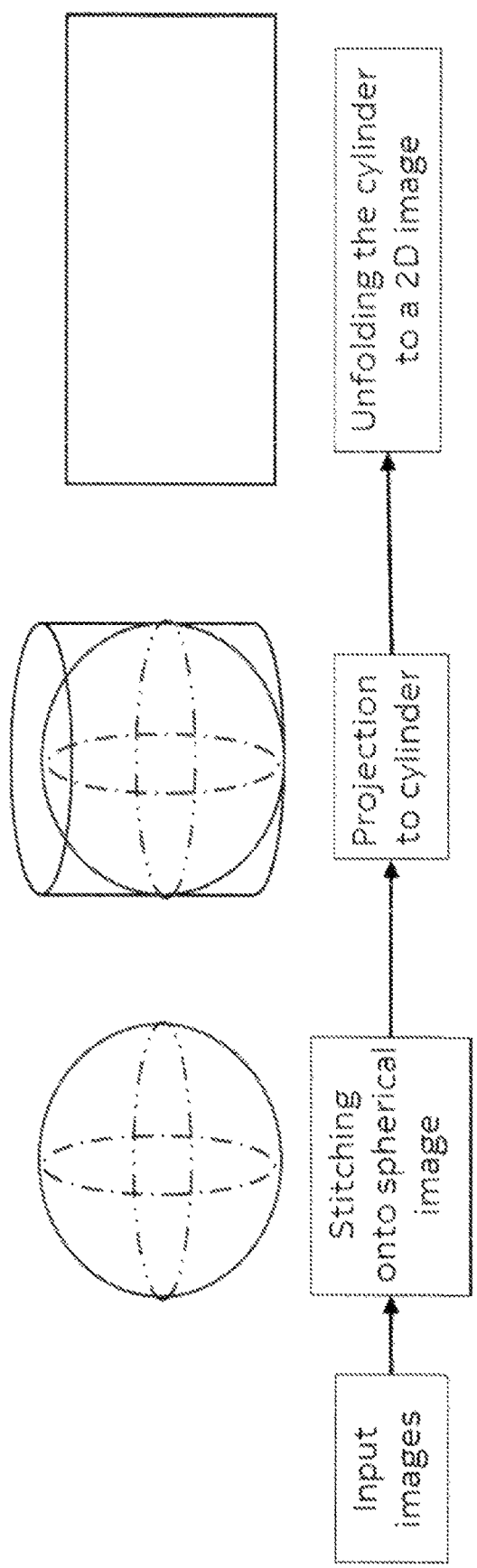
Figure 4:
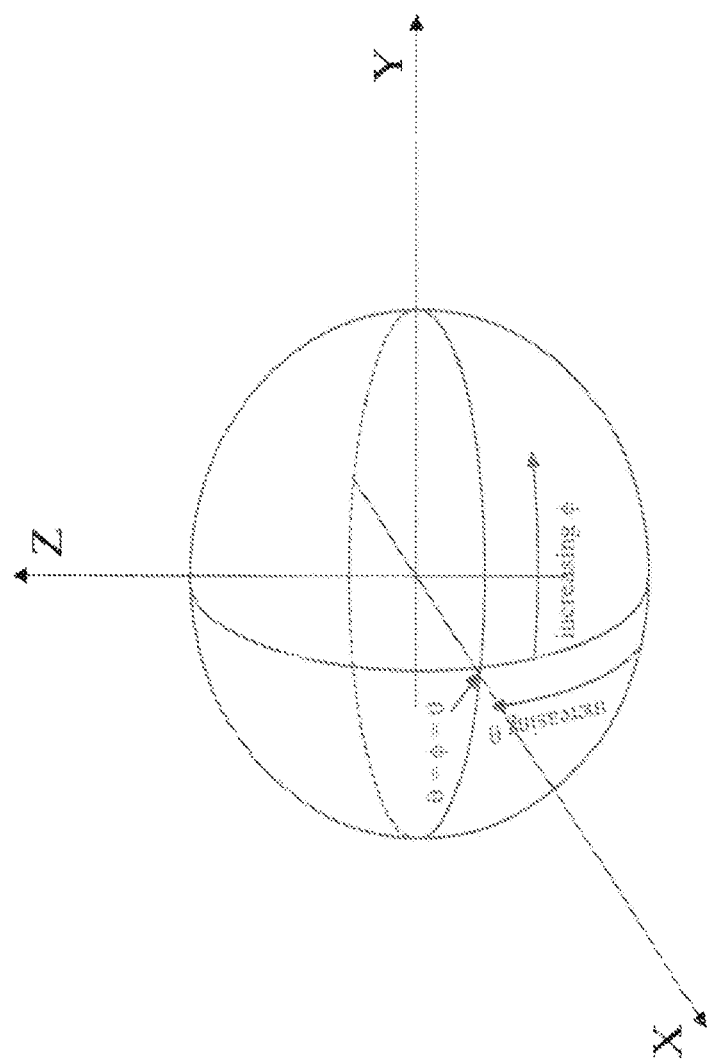
Figure 5:
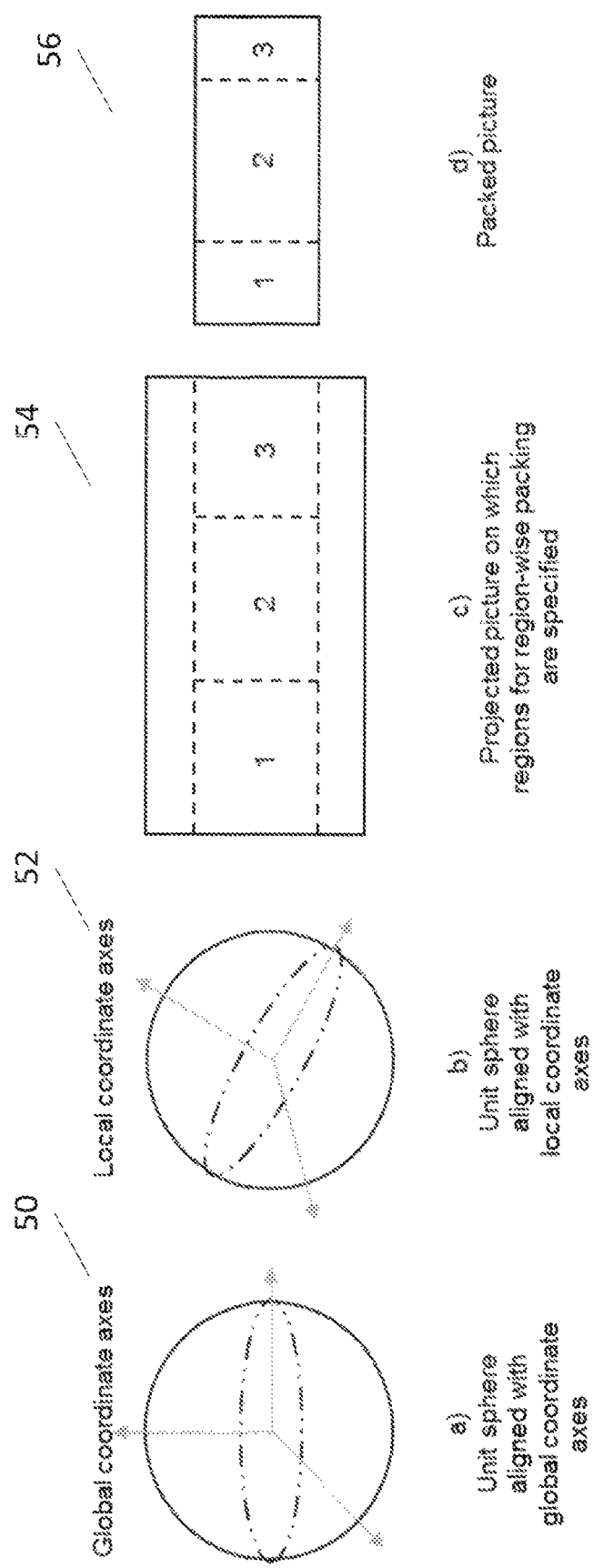
Figure 6:
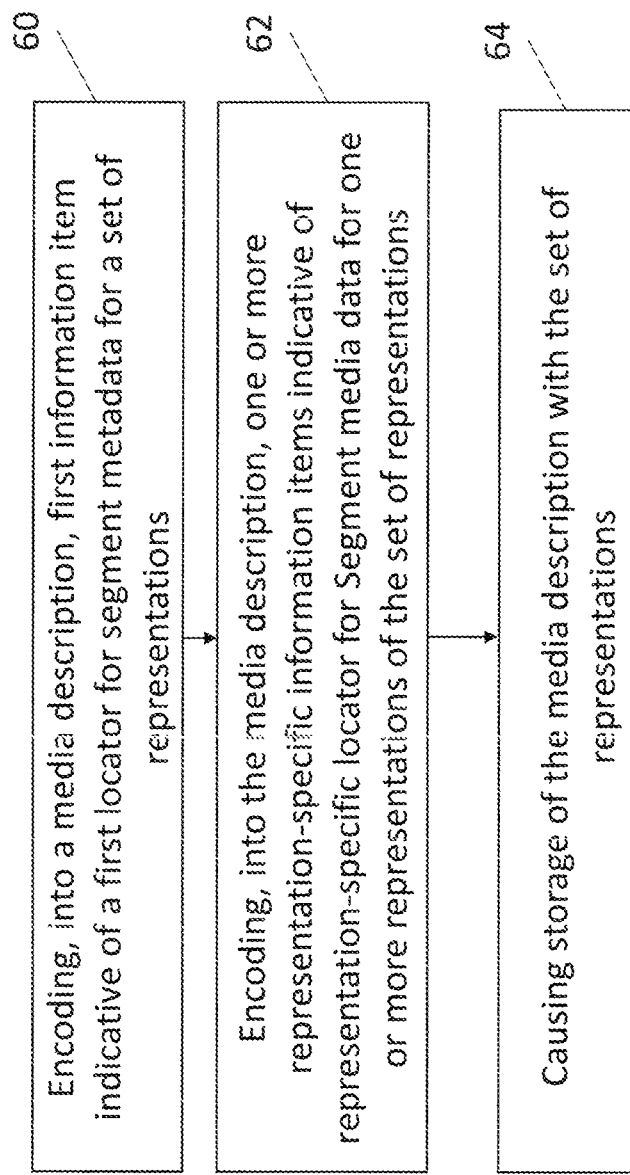
Figure 7A:
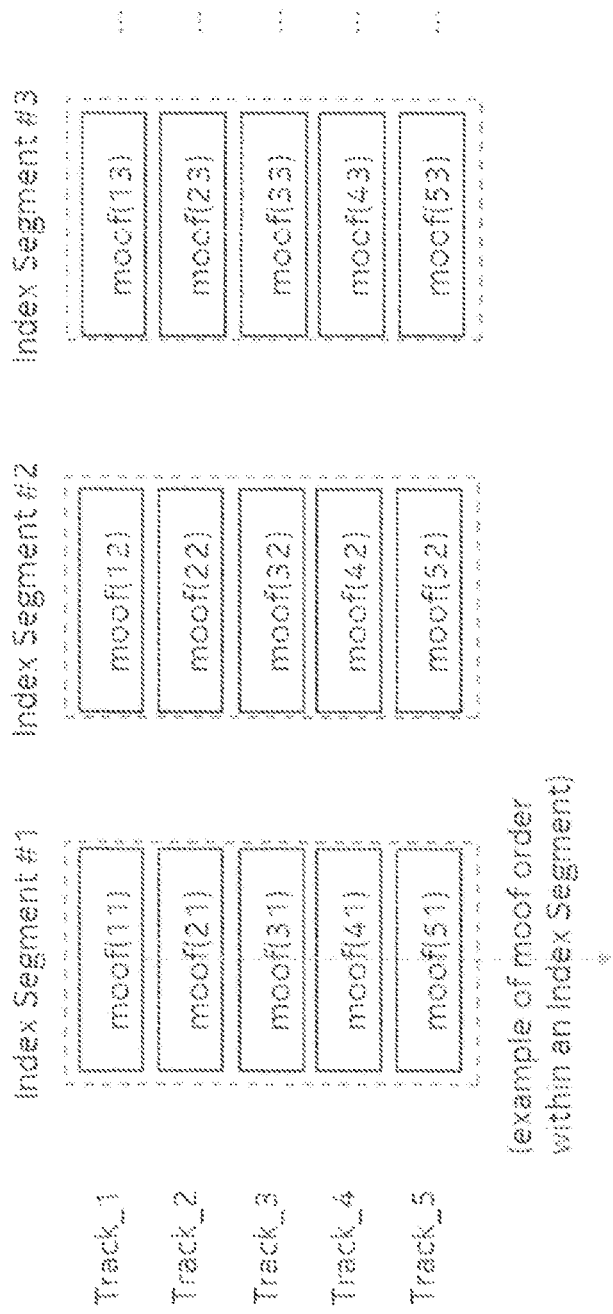
Figure 7B:
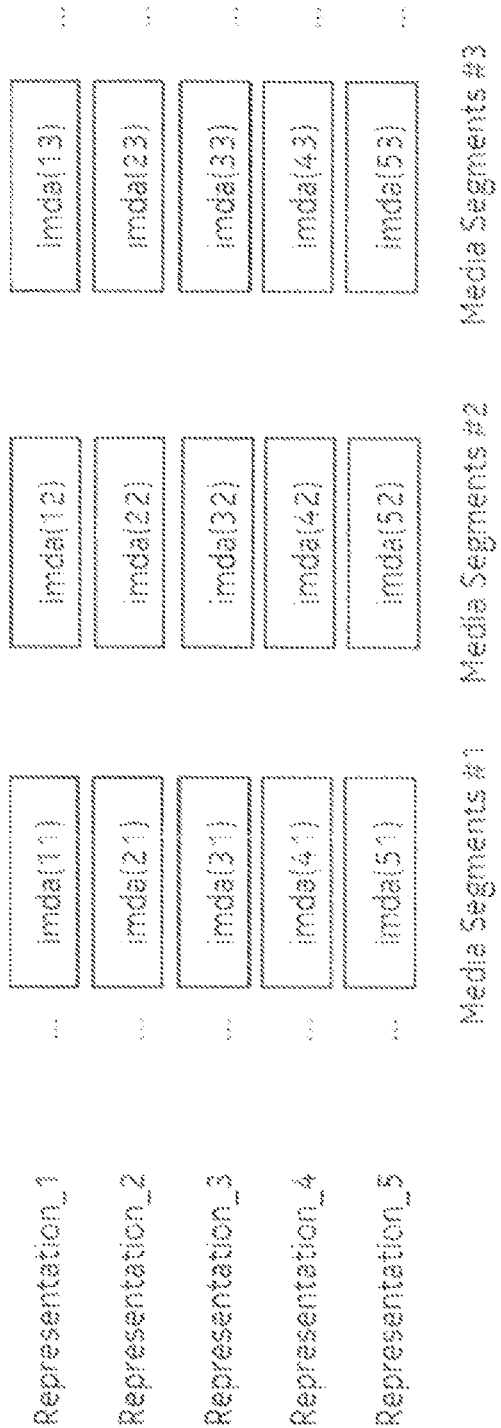
Figure 8:
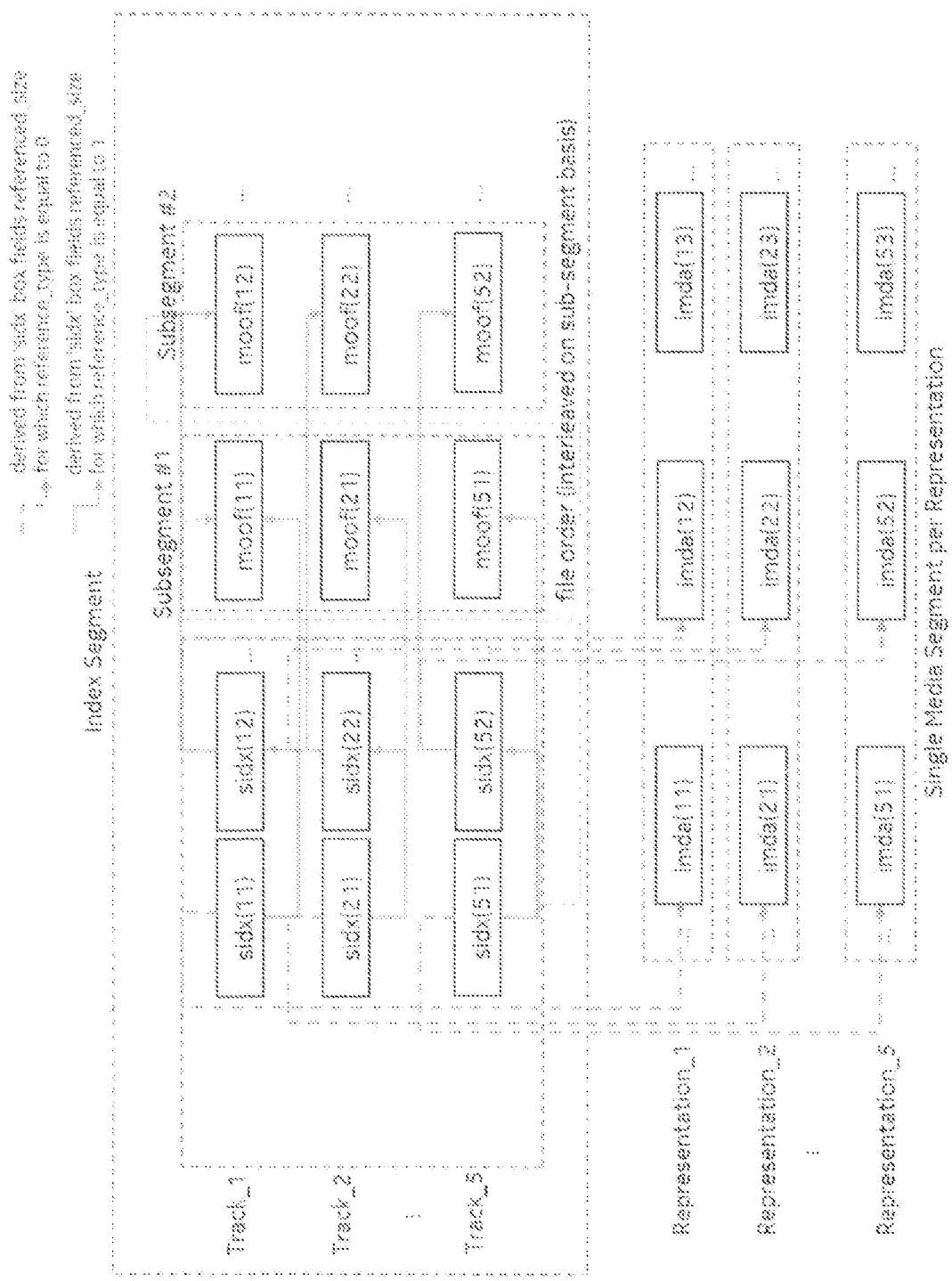
Figure 9A:
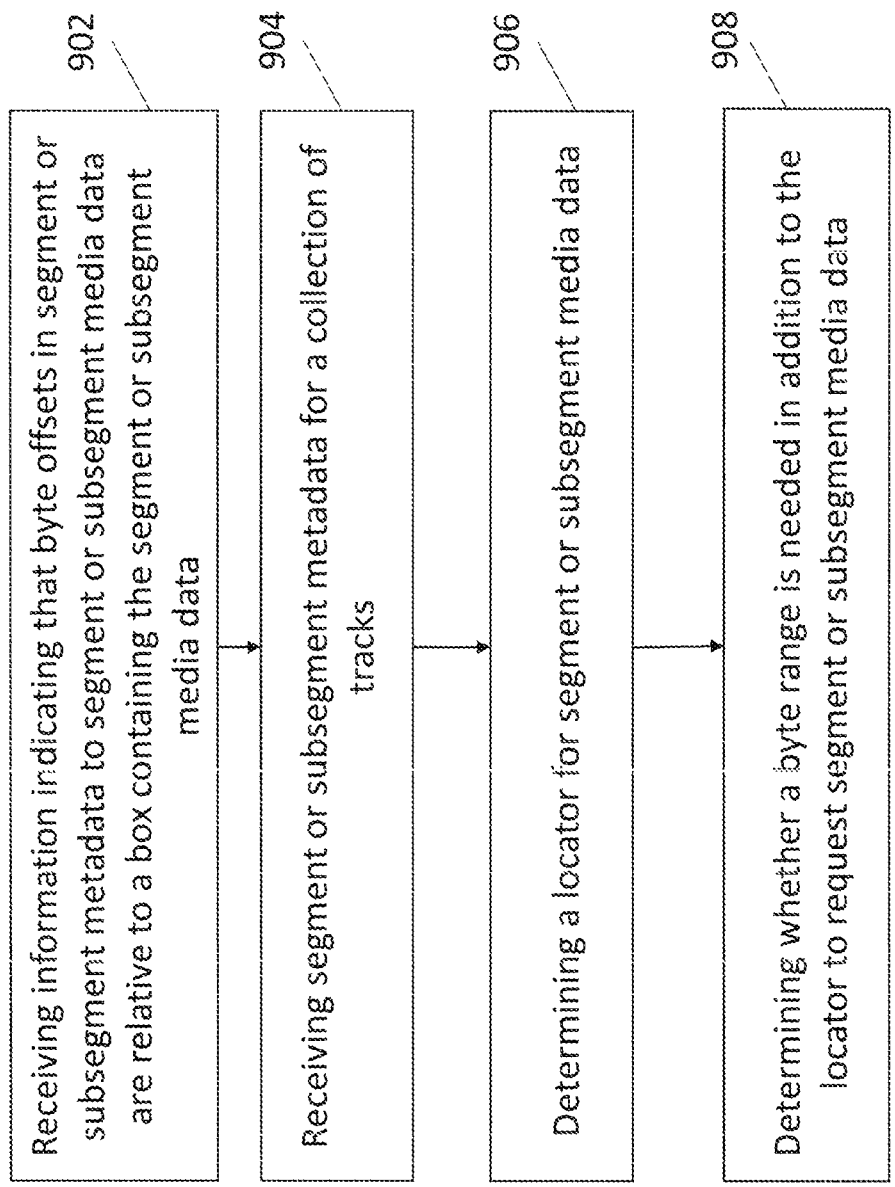
Figure 9B:
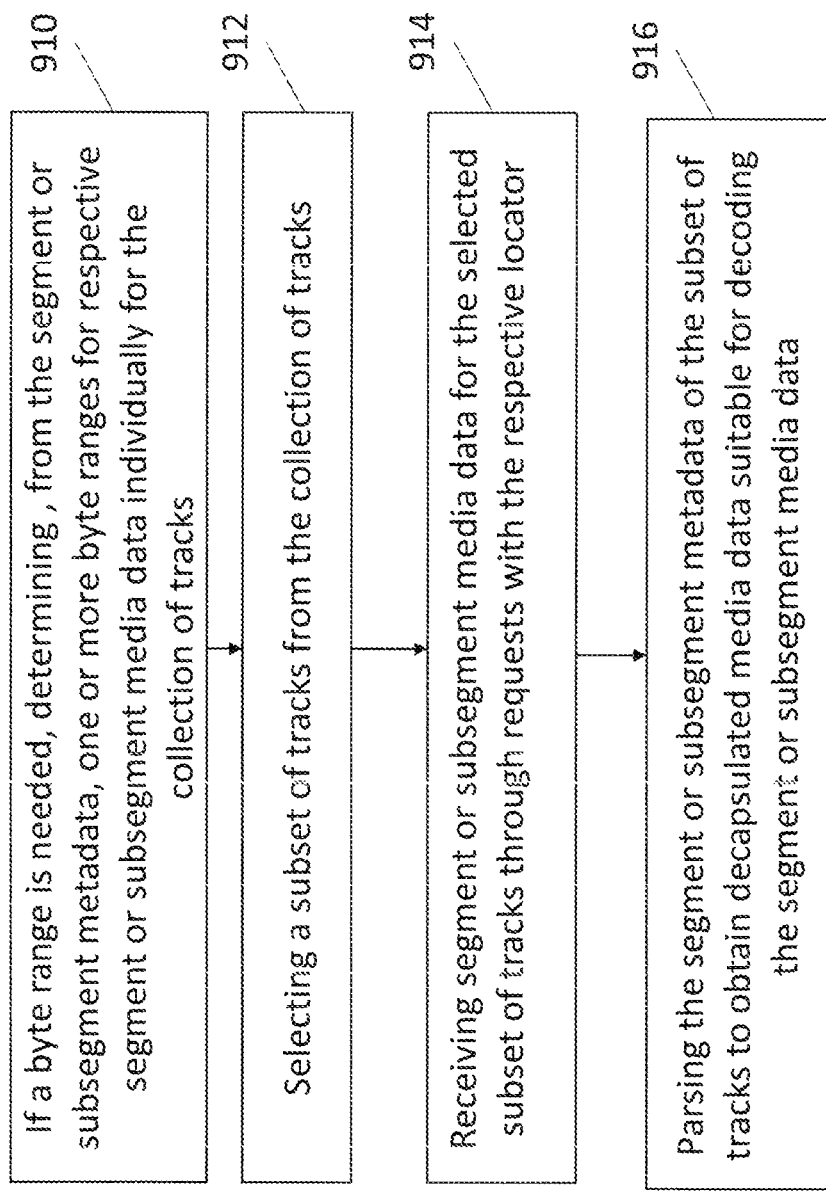
Figure 10A:
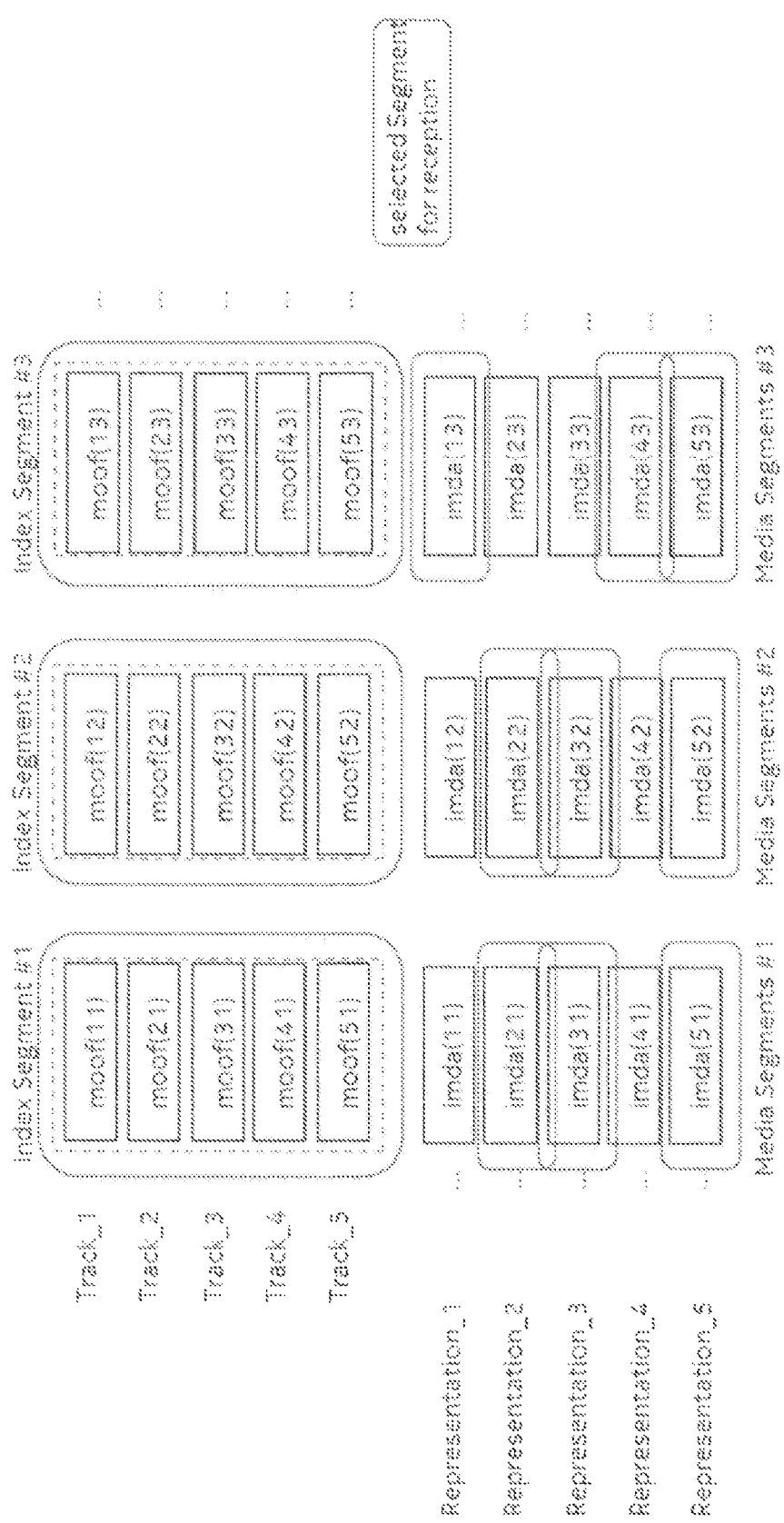
Figure 11:
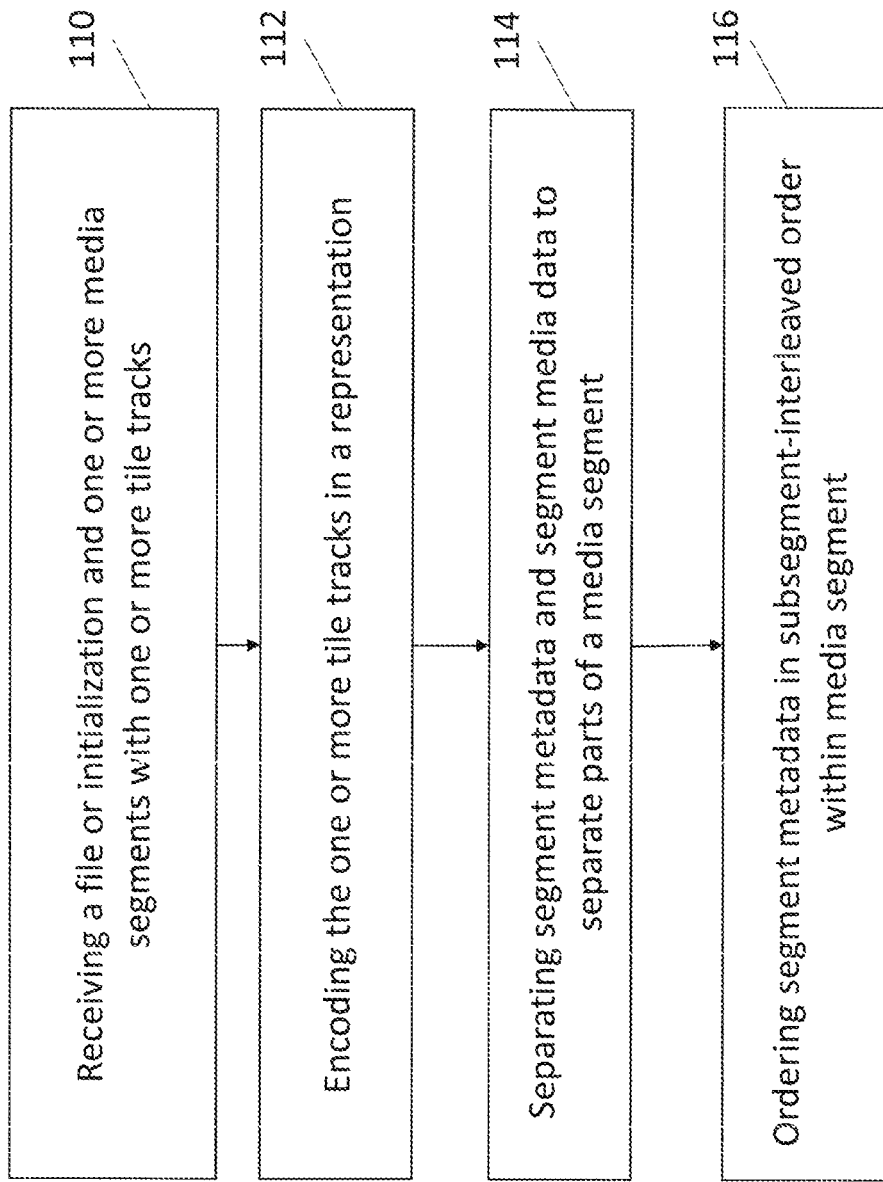
Figure 12:
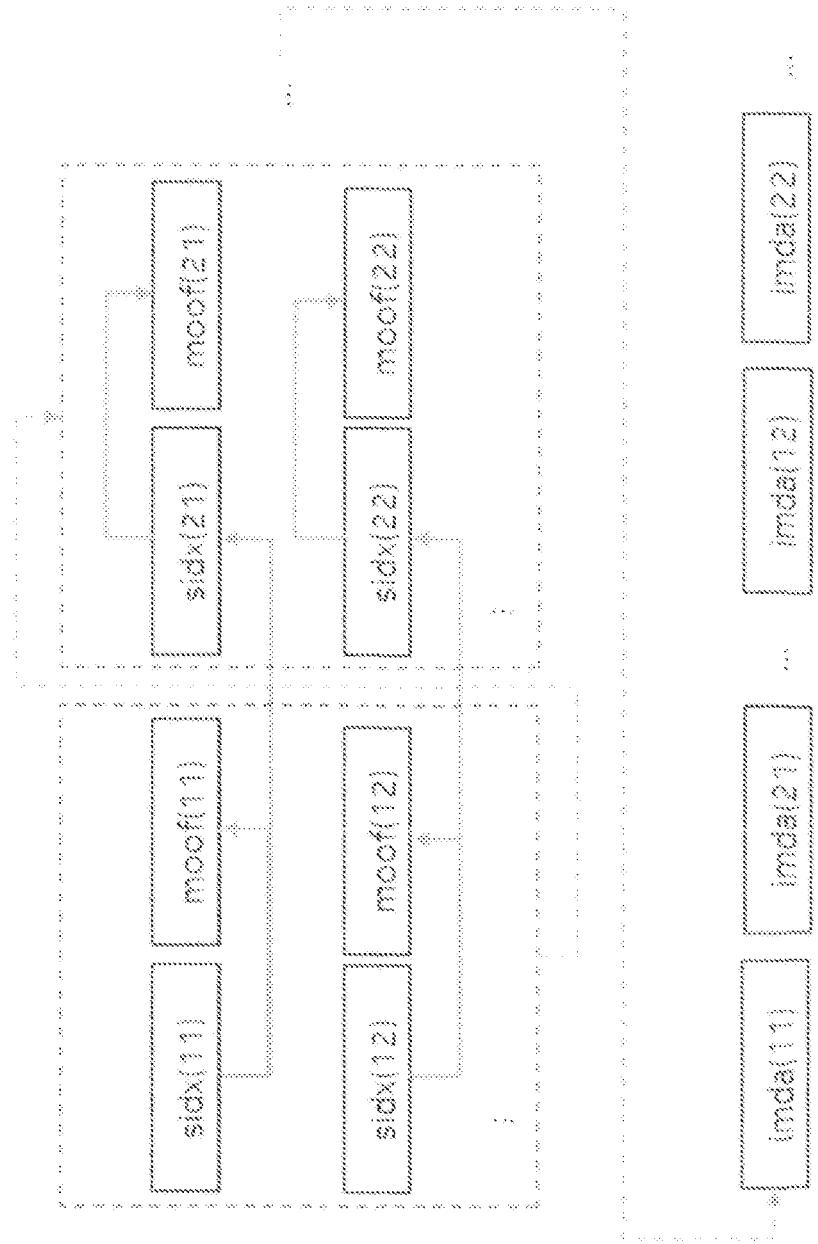
Figure 13:
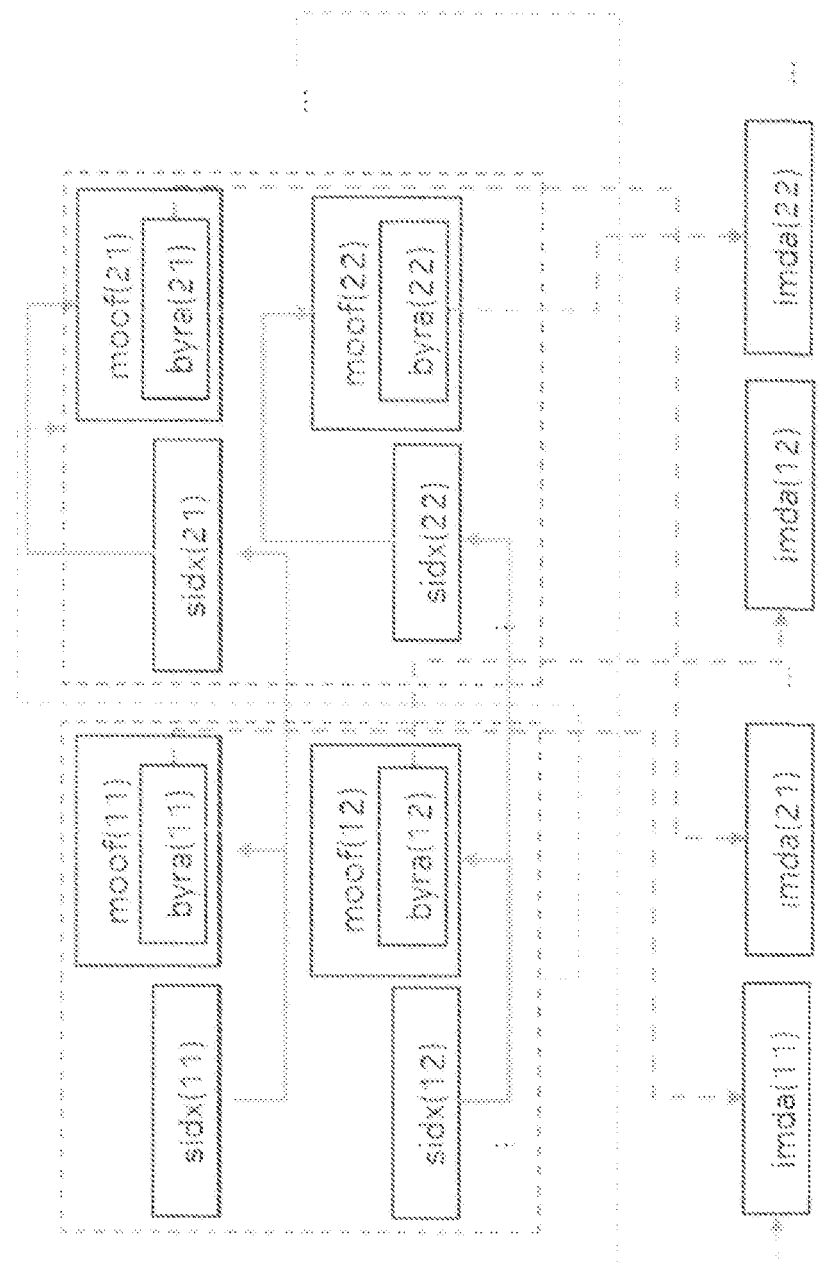

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2A is a graphical illustration of a video acquisition, encoding, and playback process in accordance with an example embodiment of the present disclosure;

FIG. 2B is a graphical illustration of an image stitching, projection, and region-wise packing process in accordance with an example embodiment of the present disclosure;

FIG. 2C is another graphical illustration of an image stitching, projection, and region-wise packing process in accordance with an example embodiment of the present disclosure;

FIG. 3 is a graphical illustration of a process of forming a monoscopic equirectangular panorama picture in accordance with an example embodiment of the present disclosure;

FIG. 4 illustrates an example coordinate system in accordance with an example embodiment of the present disclosure;

FIG. 5 is a graphical illustration of conversions from a spherical picture to a packed picture that may be used in content authoring and the corresponding conversions from a packed picture to a spherical picture to be rendered that could be used in various media players in accordance with an example embodiment of the present disclosure;

FIG. 6 is a flowchart illustrating a set of operations performed, such as by the apparatus of FIG. 1, in accordance with an example embodiment of the present disclosure;

FIGS. 7A and 7B illustrate example media and index segments in accordance with an example embodiment of the present disclosure;

FIG. 8 illustrates example media and index segments in accordance with an example embodiment of the present disclosure;

FIGS. 9A and 9B are flowcharts illustrating a set of operations performed, such as by the apparatus of FIG. 1, in accordance with an example embodiment of the present disclosure;

FIGS. 10A and 10B are graphical illustrations of index and media Segments used in the operations of the client devices;

FIG. 11 is a flowchart illustrating a set of operations performed, such as by the apparatus of FIG. 1, in accordance with an example embodiment of the present disclosure;

FIG. 12 illustrates an example media segment in accordance with an example embodiment of the present disclosure; and FIG. 13 illustrates an example byte range box in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

The terms "tile" and "sub-picture" may be used interchangeably.

A method, apparatus and computer program product are provided in accordance with an example embodiment to provide a mechanism for late binding in video encoding. The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and 3$^{rd}$ Generation Partnership Project (3GPP file format) (3GPP Technical Specification 26.244, also known as the 3GP format). ISOBMFF is the base for derivation of all the above mentioned file formats. An example embodiment is described in conjunction with the HEVC, ISOBMFF, and DASH, however, the present disclosure is not limited to HEVC, ISOBMFF, and DASH, but rather the description is given for one possible basis on top of which an example embodiment of the present disclosure may be partly or fully realized.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and 3$^{rd}$ Generation Partnership Project (3GPP file format) (3GPP Technical Specification 26.244, also known as the 3GP format). An example embodiment may be described in conjunction with the MPEG or its derivatives, however, the present disclosure is not limited to the MPEG, but rather the description is given for one possible basis on top of which an example embodiment of the present disclosure may be partly or fully realized.

Regardless of the file format of the video bitstream, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

When describing certain example embodiments, the term file is sometimes used as a synonym of syntax structure or an instance of a syntax structure. In other contexts, the term file may be used to mean a computer file, that is a resource forming a standalone unit in storage.

When describing various syntax and in certain example embodiments, a syntax structure may be specified as described below. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice may include an integer number of macroblocks ordered consecutively in the raster scan within a particular slice group.

When describing the operation of video encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as a High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size may be named as the LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Images can be split into independently codable and decodable image segments (e.g. slices or tiles or tile groups), which may also be referred to as independently coded picture regions. Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

Each TU can be associated with information describing the prediction error decoding process for the samples within the said TU (including e.g. discrete cosine transform coefficient information). It is typically signalled at a CU level whether prediction error coding is applied or not for each CU. In the case there is no prediction error residual associated with the CU, it can be considered that there are no TUs for the said CU. The division of the image into CUs, and division of CUs into PUs and TUs is typically signalled in the bitstream allowing the decoder to reproduce the intended structure of these units.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs).

Tiles are ordered in the bitstream consecutively in the raster scan order of the tile grid. A tile may contain an integer number of slices.

In the HEVC, a slice may include an integer number of CTUs. The CTUs are scanned in the raster scan order of CTUs within tiles or within a picture, if tiles are not in use. A slice may contain an integer number of tiles and a slice can be contained in a tile. Within a CTU, the CUs have a specific defined scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single Network Abstraction Layer (NAL) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft version of H.266/VVC, pictures are partitioned to tiles along a tile grid (similarly to HEVC). Two types of tile groups are specified, namely raster-scan-order tile groups and rectangular tile groups, and an encoder may indicate in the bitstream, e.g. in a PPS, which type of a tile group is being used. In raster-scan-order tile groups, tiles are ordered in the bitstream in tile raster scan order within a picture, and CTUs are ordered in the bitstream in raster scan order within a tile. In rectangular tile groups, a picture is partitioned into rectangular tile groups, and tiles are ordered in the bitstream in raster scan order within each tile group, and CTUs are ordered in the bitstream in raster scan order within a tile. Regardless of the tile group type, a tile group contains one or more entire tiles in bitstream order, and a VCL NAL unit contains one tile group. Slices have not been included in the draft version of H.266/VVC. It is noted that what was described in this paragraph might still evolve in later draft versions of H.266/VVC until the standard is finalized.

An elementary unit for the output of an H.264/advanced video coding (AVC) or HEVC encoder and the input of an H.264/AVC or HEVC decoder, respectively, is a NAL unit. For transport over packet-oriented networks or storage into structured files, NAL units may be encapsulated into packets or similar structures. In ISO base media file format, NAL units of an access unit form a sample, the size of which is provided within the file format metadata.

A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit.

When describing an example embodiment related to HEVC and VVC, the following description may be used to specify the parsing process of each syntax element.

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded syntax element with the left bit first.

An example slice segment layer raw byte sequence payload (RBSP) in HEVC is provided below:

|  | Descriptor |
|---|---|
| slice_segment_layer_rbsp( ) { | |
|   slice_segment_header( ) | |
|   slice_segment_data( ) | |
|   rbsp_slice_segment_trailing_bits( ) | |
| } | |

The slice_segment_header( ) may take the form of the folloiwng syntax:

|  | Descriptor |
|---|---|
| slice_segment_header( ) { | |
|   first_slice_segment_in_pic_flag | u(1) |
|   if( nal_unit_type >= BLA_W_LP | |
|   && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++) | |
|       slice_reserved_flag[ i ] | u(1) |
|     slice_type | ue(v) |
|     if( output_flag_present_flag ) | |
|       pic_output_flag | u(1) |
| . . . | | first_slice_segment_in_pic_flag and slice_segment_address may depend on the position of the slice segment within the picture, while the values of other syntax elements are many times unchanged in all independent slice segments of the same coded picture.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A Random Access Point (RAP) picture, which may also be referred to as an intra random access point (IRAP) picture or a random-access picture, may comprise only intra-coded image segments. Furthermore, a RAP picture may constrain subsequence pictures in output order to be such that they can be correctly decoded without performing the decoding process of any pictures that precede the RAP picture in decoding order.

A motion-constrained tile set (MCTS) is a tile set that the inter prediction process is constrained in encoding. The following restrictiona may apply: no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that neither variables nor any decoding results that are derived from blocks outside the MCTS are used in any decoding processes within the MCTS. For example, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

Sample locations used in inter prediction may be saturated. As a result, a location that would be outside the picture otherwise is saturated to point to the corresponding boundary sample of the picture. Therefore, if a tile boundary is also a picture boundary, motion vectors may effectively cross that boundary or a motion vector may effectively cause fractional sample interpolation that would refer to a location outside that boundary because the sample locations are saturated onto the boundary. The temporal motion-constrained tile sets supplemental enhancement information (SEI) message of HEVC may be used to indicate the presence of motion-constrained tile sets in the bitstream.

360-degree video or virtual reality (VR) video generally refer to video content that provides such a large field of view (FOV) that only a part of the video is displayed at a single point of time in typical displaying arrangements. For example, VR video may be viewed on a head-mounted display (HMD) that may be capable of displaying e.g. about a 100-degree field of view. The spatial subset of the VR video content to be displayed may be selected based on the orientation of the HMD. In another example, a typical flat-panel viewing environment is assumed, wherein e.g. up to a 40-degree field-of-view may be displayed. When displaying wide-FOV content (e.g., fisheye) on such a display, a spatial subset may be displayed rather than the entire picture. An example process of VR video acquisition, encoding, and playback is illustrated in FIG. 2A.

A real-world audio-visual scene (A) is captured by audio sensors and a set of cameras or a camera device with multiple lenses and sensors as illustrated in 20. The acquisition results in a set of digital image/video (Bi) and audio (Ba) signals. The cameras/lenses may cover all directions around the center point of the camera set or camera device. Audio may be captured using different microphone configurations and stored as various different content formats, including channel-based signals, static or dynamic (e.g., moving through the 3D scene) object signals, and scene-based signals (e.g., Higher Order Ambisonics). The channel-based signals typically conform to one of the loudspeaker layouts defined in Coding Independent Code Points (CICP). In an omnidirectional media application, the loudspeaker layout signals of the rendered immersive audio program may be binauralized for presentation via headphones. The images (Bi) of the same time instance may be stitched, projected, and mapped onto a packed picture (D).

For monoscopic 360-degree video, the input images of one time instance are stitched to generate a projected picture representing one view as illustrated in 22. The breakdown of image stitching, projection, and region-wise packing process for monoscopic content is illustrated in FIG. 2B. Input images (Bi) are stitched and projected onto a three-dimensional projection structure that may for example be a unit sphere. The projection structure may be considered to comprise one or more surfaces, such as plane(s) or part(s) thereof. A projection structure may be defined as a three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected frame. There may be a pre-defined set of representation formats of the projected picture, including for example an equirectangular projection (ERP) format and a cube map projection (CMP) format. It may be considered that the projected picture covers the entire sphere.

Optionally, region-wise packing may be applied to map the projected picture onto a packed picture. If the region-wise packing is not applied, the packed picture is identical to the projected picture, and the projected picture is given as input to image/video encoding. If the region-wise packing is applied, regions of the projected picture are mapped onto a packed picture (D) by indicating the location, shape, and size of each region in the packed picture, and the packed picture (D) is given as input to image/video encoding. Region-wise packing refers to a process by which a projected picture is mapped to a packed picture. A packed picture refers to a picture that results from region-wise packing of a projected picture.

Sample locations used in inter prediction may be saturated. As a result, a location that would be outside the picture otherwise is saturated to point to the corresponding boundary sample of the picture. Therefore, in some use cases, if a tile boundary is also a picture boundary, motion vectors may effectively cross that boundary or a motion vector may effectively cause fractional sample interpolation that would refer to a location outside that boundary because the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries. The temporal motion-constrained tile sets supplemental enhancement information (SEI) message of HEVC may be used to indicate the presence of motion-constrained tile sets in the bitstream.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and ISOBMFF specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISOBMFF, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box (a.k.a. MediaDataBox) and the movie 'moov' box (a.k.a. MovieBox) may be used to enclose the metadata. In some cases, for a file to be operable, both of the 'mdat' and 'moov' boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel.

Movie fragments may be used e.g. for streaming delivery or progressive downloading of media content, or when recording content to ISOBMFF files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISOBMFF file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box (a.k.a. MovieExtendsBox) indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

BoxFileIndexBox is specified as part of ISO/IEC 23001-14. The BoxFileIndexBox provides a summary of the box hierarchy of the associated file or segment. It contains a set of BoxIndexBox boxes, each of which describes one top-level box, e.g. giving the box type and box size (in bytes).

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single file or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation.

Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box (a.k.a. SegmentIndexBox or 'sidx' box), which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Sub-segment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

SegmentIndexBox may have the following syntax:

```
aligned(8) class SegmentIndexBox extends
    FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)              reference_type;
        unsigned int(31)    referenced_size;
        unsigned int(32)    subsegment_duration;
        bit(1)                starts_with_SAP;
        unsigned int(3)     SAP_type;
        unsigned int(28)    SAP_delta_time;
    }
}
```

The semantics of some syntax elements of SegmentIndexBox may be specified as follows.

reference_type: when set to 1 indicates that the reference is to a SegmentIndexBox; otherwise the reference is to media content (e.g., in the case of files based on ISOBMFF, to a MovieFragmentBox); if a separate index segment is used, then entries with reference type 1 are in the index segment, and entries with reference type 0 are in the media file.

referenced_size: the distance in bytes from the first byte of the referenced item to the first byte of the next referenced item, or in the case of the last entry, the end of the referenced material.

The term Segment Index may be defined as a compact index of the time range to byte range mapping within a Media Segment separately from the MPD. A Segment Index may comprise one or more SegmentIndexBoxes.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

MPEG-DASH defines segment-container formats for both ISO Base Media File Format and MPEG-2 Transport Streams. Other specifications may specify segment formats based on other container formats. For example, a segment format based on Matroska container file format has been proposed.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements.

In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used for a Representation comprising Sub-Representations, the following applies:

The Initialization Segment contains the Level Assignment box.

The Subsegment Index box ('ssix') is present for each Subsegment.

The attribute @level specifies the level to which the described Sub-Representation is associated to in the Subsegment Index. The information in Representation, Sub-Representation and in the Level Assignment ('leva') box contains information on the assignment of media data to levels.

Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box (a.k.a. LevelAssignmentBox) contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix', a.k.a. SubsegmentIndexBox) provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one \partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

In DASH the automated selection between Representations in the same Adaptation Set have been performed based on the width and height (@width and @height); the frame rate (@frameRate); the bitrate (@bandwidth); indicated quality ordering between the Representations (@qualityRanking) The semantics of @qualityRanking are specified as follows: specifies a quality ranking of the Representation relative to other Representations in the same Adaptation Set. Lower values represent higher quality content. If not present, then no ranking is defined.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

In some video coding standards, such as MPEG-2, each intra picture has been a random access point in a coded sequence. The capability of flexible use of multiple reference pictures for inter prediction in some video coding standards, such as H.264/AVC and H.265/HEVC, has a consequence that an intra picture may not be sufficient for random access. Therefore, pictures may be marked with respect to their random access point functionality rather than inferring such functionality from the coding type; for example an IDR picture as specified in the H.264/AVC standard can be used as a random access point. A closed group of pictures (GOP) is such a group of pictures in which all pictures can be correctly decoded. For example, in H.264/AVC, a closed GOP may start from an IDR access unit.

An open group of pictures (GOP) is such a group of pictures in which pictures preceding the initial intra picture in output order may not be correctly decodable but pictures following the initial intra picture in output order are correctly decodable. Such an initial intra picture may be indicated in the bitstream and/or concluded from the indications from the bitstream, e.g. by using the CRA NAL unit type in HEVC. The pictures preceding the initial intra picture starting an open GOP in output order and following the initial intra picture in decoding order may be referred to as leading pictures. There are two types of leading pictures: decodable and non-decodable. Decodable leading pictures, such as RADL pictures of HEVC, are such that can be correctly decoded when the decoding is started from the initial intra picture starting the open GOP. In other words, decodable leading pictures use only the initial intra picture or subsequent pictures in decoding order as reference in inter prediction. Non-decodable leading pictures, such as RASL pictures of HEVC, are such that cannot be correctly decoded when the decoding is started from the initial intra picture starting the open GOP.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

For 360-degree videos, the input images of one time instance are stitched to generate a projected picture representing two views, one for each eye. Both views may be mapped onto the same packed picture and encoded by a traditional 2D video encoder. FIG. 2C illustrates the encoding process for 360-degree videos. Alternatively, each view of the projected picture may be mapped to its own packed picture, in which case the image stitching, projection, and region-wise packing may be performed in a manner similar to the process illustrated in FIG. 2B. A sequence of packed pictures of either the left view or the right view may be independently coded or, when using a multiview video encoder, predicted based on the other view.

The image stitching, projection, and region-wise packing process may be carried out multiple times for the same source images to create different versions of the same content, e.g. for different orientations of the projection structure. Similarly, the region-wise packing process may be performed multiple times from the same projected picture to create more than one sequence of packed pictures to be encoded.

360-degree panoramic content (e.g., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. The process of forming a monoscopic equirectangular panorama picture is illustrated in FIG. 3. A set of input images, such as fisheye images of a camera array or a camera device with multiple lenses and sensors, may be stitched onto a spherical image. The spherical image may be further projected onto a cylinder (without the top and bottom faces). The cylinder may be unfolded to form a two-dimensional projected frame. One or more of these operations may be merged; for example, the input images may be directly projected onto a cylinder without an intermediate projection onto a sphere. The projection structure for an equirectangular panorama may be considered to be a cylinder that comprises a single surface.

360-degree content can be mapped onto different types of solid geometrical structures, such as a polyhedron (e.g., a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some embodiments, panoramic content with 360-degree horizontal field-of-view but with less than 180-degree vertical field-of-view may be considered special cases of equirectangular projection, where the polar areas of the sphere have not been mapped onto the two-dimensional image plane. In some embodiments, a panoramic image may have less than a 360-degree horizontal field-of-view and up to a 180-degree vertical field-of-view, while otherwise having the characteristics of equirectangular projection format.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Region-wise packing information may be encoded as rectangular region-wise packing metadata. For each region, the rectangular region-wise packing metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

As an example, region-wise packing provides signalling for the following usage scenarios:
1) Additional compression for viewport-independent projections is achieved by densifying sampling of different regions to achieve more uniformity across the sphere. For example, the top and bottom parts of ERP are oversampled, and region-wise packing can be applied to down-sample them horizontally.
2) Arranging the faces of plane-based projection formats, such as cube map projection, in an adaptive manner.
3) Generating viewport-dependent bitstreams that use viewport-independent projection formats. For example, regions of ERP or faces of CMP can have different sampling densities and the underlying projection structure can have different orientations.
4) Indicating regions of the packed pictures represented by an extractor track, such as when an extractor track collects tiles from bitstreams of different resolutions.

MPEG Omnidirectional Media Format (ISO/IEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

Omnidirectional Media Format (OMAF) allows the omission of image stitching, projection, and region-wise packing and encodes the image/video data in their captured format. In this case, images D are considered the same as images Bi and a limited number of fisheye images per time instance are encoded.

For audio signal, the stitching process may be not needed because the captured signals may be inherently immersive and omnidirectional. The stitched images (D) are encoded as coded images (Ei) or a coded video bitstream (Ev). The captured audio (Ba) is encoded as an audio bitstream (Ea). The coded images, video, and/or audio are then composed into a media file for file playback (F) or a sequence of an initialization segment and media segments for streaming (Fs), according to a particular media container file format, by way of example, the ISOBMFF. A file encapsulator may also encapsulate the metadata into the file or the segments, such as projection and region-wise packing information assisting in rendering the decoded packed pictures. The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

The segments Fs may be delivered using a delivery mechanism to a playback device. The file that includes the file encapsulator outputs (F) may be identical to the file that includes the file decapsulator inputs (F'). A file decapsulator processes the file (F') or the received segments (F's) and extracts the coded bitstreams (E'a, E'v, and/or E'i) and parses the metadata. The audio, video, and/or images are then decoded into decoded signals (B'a for audio, and D' for images/video). The decoded packed pictures (D') are projected onto the screen of a head-mounted display or any other display device based on the current viewing orientation or viewport and the projection, spherical coverage, projection structure orientation, and region-wise packing metadata parsed from the file. Likewise, decoded audio (B'a) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used by the video and audio decoders for decoding optimization The human eyes are not capable of viewing the whole 360 degrees space, but are limited to a maximum horizontal FOV and a maximum vertical FoV (respectively, HHFoV, HVFoV). Also, a HMD device has technical limitations that allow only viewing a subset of the whole 360 degrees space in horizontal and vertical directions (respectively, DHFoV, DVFoV). At any point of time, a video rendered by an application on a HMD renders a portion of the 360 degrees video. This portion is defined as a Viewport. A viewport is a window on the 360 world represented in the omnidirectional video displayed via a rendering display. A viewport is characterized by horizontal and vertical FoVs (respectively, VHFoV, VVFoV). In the following, VHFoV and VVFoV will be simply abbreviated with HFoV and VFoV.

In various media formats such as the OMAF, a coordinate system illustrated in FIG. 4 is utilized. As illustrated in FIG. 4, the coordinate system consists of a unit sphere and three coordinate axes, namely the X (back-to-front) axis, the Y (lateral, side-to-side) axis, and the Z (vertical, up) axis, where the three axes cross at the center of the sphere and extend orthogonally therefrom. The location of a point on the sphere is identified by a pair of sphere coordinates azimuth ($\phi$) and elevation ($\theta$). The value ranges of azimuth is −180.0, inclusive, to 180.0, exclusive, degrees. The value range of elevation is −90.0 to 90.0, inclusive, degrees.

FIG. 5 illustrates the conversions from a spherical picture to a packed picture that may be used in content authoring and the corresponding conversions from a packed picture to a spherical picture to be rendered that could be used in various media players, such as an OMAF player. The example in this clause is described for a packed picture that appears in a projected omnidirectional video track. Similar description could be derived for an image item. The content authoring could include the following ordered operatons:

Operation A: The source images provided as input are stitched to generate a sphere picture on the unit sphere per the global coordinate axes as indicated in 50.

Operation B: The unit sphere is then rotated relative to the global coordinate axes, as indicated in 52. The amount of rotation to convert from the local coordinate axes to the global coordinate axes may be specified by the rotation angles indicated in a RotationBox syntax structure. The local coordinate axes of the unit sphere are the axes of the coordinate system that has been rotated. The absence of RotationBox may indicate that the local coordinate axes are the same as the global coordinate axes.

Operation C: As illustrated in 54, the spherical picture on the rotated unit sphere is then converted to a two-dimensional projected picture, for example using the equirectangular projection. When spatial packing of stereoscopic content is applied, two spherical pictures for the two views are converted to two constituent pictures, after which frame packing is applied to pack the two constituent pictures to one projected picture.

Operation D: Rectangular region-wise packing could be applied to obtain a packed picture from the projected picture. One example of packing is depicted in 54 and 56. The dashed rectangles in 54 indicate the projected regions on a projected picture, and the respective areas in 56 indicate the corresponding packed regions. In this example, projected regions 1 and 3 are horizontally downsampled, while projected region 2 is kept at its original resolution.

A CoverageInformationBox syntax structure could be used to indicate which part of the sphere is covered by the packed picture.

In order to map sample locations of a packed picture, such as that in 56, to a unit sphere used in rendering illustrated in 50, the OMAF player could perform the following ordered operations:

- A packed picture, such as that in 56, is obtained as a result of decoding a picture from a video track or an image item.
- If needed, chroma sample arrays of the packed picture are upsampled to the resolution of the luma sample array of the packed picture, and color space conversion could also be performed.
- If region-wise packing is indicated, the sample locations of the packed picture are converted to sample locations of the respective projected picture, such as that in 54. Otherwise, the projected picture is identical to the packed picture.
- If spatial frame packing of the projected picture is indicated, the sample locations of the projected picture are converted to sample locations of the respective constituent picture of the projected picture. Otherwise, the constituent picture of the projected picture is identical to the projected picture.
- The sample locations of a constituent picture of the projected picture are converted to sphere coordinates that are relative to local coordinate axes, as specified for the omnidirectional projection format being used. The resulting sample locations correspond to a sphere picture depicted in 52.
- If rotation is indicated, the sphere coordinates relative to the local coordinate axes are converted to sphere coordinates relative to the global coordinate axes. Otherwise, the global coordinate axes are identical to the local coordinate axes.

In order to reduce the streaming bitrate of VR video, viewport dependent delivery may be introduced with a subset of 360-degree video content covering the primary viewport (e.g., the current view orientation) being transmitted at the best quality/resolution, while the remainder of the 360-degree video is transmitted at a lower quality/resolution. In viewport-specific encoding/packing, 360-degree image content is packed into the same frame with an emphasis (e.g., greater spatial area) on the primary viewport. Several versions of the content are created for different primary viewport orientations and/or FOVs. Viewport-specific encoding/packing may be achieved through asymmetric projection (a.k.a. viewport-dependent projection), wherein the viewport area is encoded in the highest sampling density, and the rest of the 360° scene is projected in a way that the sampling density is gradually decreasing from the viewport to non-viewport areas. The re-projected non-viewport area is packed into the same image plane as the viewport area. In a region-wise mixed quality approach, the viewport area is encoded with the highest picture quality, while the other areas are encoded with lower quality. In a region-wise mixed resolution approach, a viewport-independent projection is applied and the projected 2D picture is resampled region-wise prior to its encoding in a manner that the viewport originates from the highest 2D resolution and other areas originate from lower 2D resolutions.

In tile-based viewport-dependent streaming approaches, projected pictures are partitioned into tiles that are coded as motion-constrained tile sets (MCTSs). Tile-based viewport-adaptive streaming schemes can be categorized as follows:

1. Region-wise mixed quality (RWMQ) 360° video: Several versions of the content are encoded using MCTSs on the same tile grid, each version with different bitrate and picture quality. Players select on MCTS basis which version is received so that the quality of the MCTSs covering the viewport is higher than that of the other received MCTSs.
2. Viewport +360° video: MCTSs for a complete low-resolution omnidirectional picture and high-resolution tiles covering the viewport are received.
3. Region-wise mixed resolution (RWMR) 360° video: Tiles are encoded at multiple resolutions. Players select a combination of high resolution tiles covering the viewport and low-resolution tiles for the remaining areas.

All these approaches may be applied regardless of whether client-driven bitstream rewriting (a.k.a. late binding) or with author-driven image segment (e.g. MCTS) merging (a.k.a. early binding), such as extractor-driven sub-picture track merging, is in use. In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently. In all these approaches, tiles (or their guard bands) may overlap by an amount selected in the pre-processing or encoding.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. Tile tracks may be used for viewport-dependent streaming as follows: At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used used to refer to tile tracks from a tile base track, and the tile ordering is indicated by the order of the tile tracks contained by a 'sabt' track reference. Furthermore, in HEVC, a tile track has is a 'tbas' track reference to the tile base track.

When an extractor is processed by a file reader that requires an extractor, the extractor is logically replaced by the bytes resulting when resolving the contained constructors in their appearance order. In some embodiments, nested extraction may be disallowed, e.g., the bytes referred to by a sample constructor may not contain extractors; and an extractor may not reference, directly or indirectly, another extractor. An extractor may contain one or more constructors for extracting data from the current track or from another track that is linked to the track in which the extractor resides by means of a track reference of type 'scal'.

In an example, the bytes of a resolved extractor are one of the following:
a) One entire NAL unit; note that when an Aggregator is referenced, both the included and referenced bytes are copied
b) More than one entire NAL unit
In both cases the bytes of the resolved extractor start with a valid length field and a NAL unit header.

The bytes of a sample constructor are copied only from the single identified sample in the track referenced through the indicated 'scal' track reference. The alignment is on decoding time, e.g., using the time-to-sample table only, followed by a counted offset in sample number. Extractors are a media-level concept and hence apply to the destination track before any edit list is considered. Often times, the edit lists in the two tracks would be identical. The following syntax may be used:

```
class aligned(8) Extractor ( ) {
    NALUnitHeader( );
    do {
        unsigned int(8) constructor_type;
        if( constructor_type ==0 )
            SampleConstructor( );
        else if( constructor_type == 2 )
            InlineConstructor( );
    } while( !EndOfNALUnit( ) )
}
```

NALUnitHeader( ) is the first two bytes of HEVC NAL units. A particular nal_unit_type value indicates an extractor, e.g., nalunit_type equal to 49. constructor_type specifies the constructor being used. EndOfNALUnit( ) is a function that returns 0 (false) when more data follows in this extractor; otherwise it returns 1 (true). The sample constructor (SampleConstructor) may have the following syntax:

```
class aligned(8) SampleConstructor ( ) {
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
``` track_ref_index identifies the source track from which data is extracted. track_ref_index is the index of the track reference of type 'scal'. The first track reference has the index value 1; the value 0 is reserved. The sample in that track from which data is extracted is temporally aligned or nearest preceding in the media decoding timeline, e.g., using the time-to-sample table only, adjusted by an offset specified by sample_offset with the sample containing the extractor. sample_offset gives the relative index of the sample in the linked track that may be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on. data_offset is the offset of the first byte within the reference sample to copy. If the extraction starts with the first byte of data in that sample, the offset takes the value 0. data_length is the number of bytes to copy.

The syntax of the in-line constructor may be specified as follows:

```
class aligned(8) InlineConstructor ( ) {
    unsigned int(8) length;
    unsigned int(8) inline_data[length];
}
``` length is the number of bytes that belong to the Inline-Constructor following this field. inline_data is the data bytes to be returned when resolving the in-line constructor.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:

Referencing track identifiers from a tile base track or an extractor track.

Referencing tile group identifiers from a tile base track or an extractor track, wherein the tile group identified by a tile group identifier contains the collocated tile tracks or the sub-picture tracks that are alternatives for extraction.

In the RWMQ method, one extractor track per each picture size and each tile grid is sufficient. In 360°+ viewport video and RWMR video, one extractor track may be needed for each distinct viewing orientation.

An identified media data box may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 64-bit unsigned integer is used in the syntax, other field lengths and other basic data types (e.g., string) are similarly possible. An example identified meta data box is provided below:

```
aligned(8) class IdentifiedMediaDataBox extends Box('imda') {
    unsigned int(64) imda_identifier;
    bit(8) data[ ]; // until the end of the box
}
```

A box, herein referred to as DataEntryImdaBox, may be used for referencing data in an identified media data box. The DataEntryImdaBox identifies the IdentifiedMediaDataBox containing the media data accessed through the data_reference_index corresponding to this DataEntryImdaBox. The DataEntryImdaBox contains the value of the imda identifier of the referred IdentifiedMediaDataBox. The media data offsets are relative to the first byte of the payload of the referred IdentifiedMediaDataBox. In other words, media data offset 0 points to the first byte of the payload of the referred IdentifiedMediaDataBox. A sample entry contains data_reference_index that identifies which data reference of the DataReferenceBox is in use for containing the samples referencing the sample entry. When an IdentifiedMediaDataBox is used in containing samples, the data_reference_index is set to a value pointing to a DataEntryImdaBox. The syntax of DataEntryImdaBox may be specified as follows, where imda_ref_identifier provides an imda_identifier value and thus identifies a particular IdentifiedMediaDataBox:

```
aligned(8) class DataEntryImdaBox (bit(24) flags)
    extends FullBox('imdt', version = 0, flags) {
    unsigned int(64) imda_ref_identifier;
}
```

In an example, an identifier value for the identified media data box of a (Sub)segment or movie fragment is determined and that identifier value is provided as the data reference basis for the media data of the (Sub)segment or movie fragment. In an example, a template scheme for the identifier for the identified media data box is defined to be used as a data reference for sample data, e.g. in DataReferenceBox. The template scheme may be based on but is not limited to the movie fragment sequence number (such as the sequence_number field of the MovieFragmentHeaderBox) or track fragment decode time (such as the baseMediaDecodeTime field of TrackFragmentBaseMediaDecodeTimeBox). It needs to be understood that any identifier provided for a movie fragment or a track fragment may be appropriate for the template scheme in addition to or instead of those described above. In an example, the following syntax may be used for referencing an identified media data box using a template for deriving the identifier.

```
aligned(8) class DataEntryTfdtBasedImdaBox (bit(24) flags)
    extends FullBox('imdt', version = 0, flags) {
}
```

The DataEntryTfdtBasedImdaBox identifies the IdentifiedMediaDataBox containing the media data accessed through the data_reference_index corresponding to this DataEntryTfdtBasedImdaBox. Media data offset 0 points to the first byte of the payload of the IdentifiedMediaDataBox that has imda_identifier equal to baseMediaDecodeTime of the TrackFragmentBaseMediaDecodeTimeBox. In one embodiment, 64-bit imda identifier values are used in order to carry the 64-bit value of baseMediaDecodeTime. If 32-bit baseMediaDecodeTime values are in use, the most-significant bits of the 64-bit imda_identifier may be set to 0. For self-contained movie fragments, the imda_identifier of the IdentifiedMediaDataBox is required to be equal to the baseMediaDecodeTime of TrackFragmentBaseMediaDecodeTimeBox, when the referenced data reference entry is of type DataEntryTfdtBasedImdaBox.

In another example, the following syntax may be used for referencing an identified media data box using a template for deriving the identifier.

```
aligned(8) class DataEntrySeqNumImdaBox (bit(24) flags)
    extends FullBox('snim', version = 0, flags) {
}
```

The DataEntrySeqNumImdaBox identifies the IdentifiedMediaDataBox containing the media data accessed through the data_reference_index corresponding to this DataEntrySeqNumImdaBox. When a data_reference_index included in a sample entry refers to DataEntrySeqNumImdaBox, each sample referring to the sample entry is contained in a movie fragment, and media data offset 0 points to the first byte of the payload of the IdentifiedMediaDataBox that has imda_identifier equal to sequence_number of the MovieFragmentHeaderBox of the movie fragment containing the sample.

The size of the MovieFragmentBox need not be known at the time of determining the base data offset(s) of the track(s) of the movie fragment, and consequently the child boxes of the MovieFragmentBox (e.g. TrackFragmentHeaderBox and TrackRunBoxes) can be authored "progressively" before all coded media data for the movie fragment is available. Moreover, the content encapsulator does not need to estimate the size of the segment header correctly and has the flexibility of some dynamic variability of segment durations.

In some embodiments, media segment header and segment payload may be made separately available by compiling a streaming manifest indicating separate Uniform Resource Locators (URLs) for a segment header and a corresponding segment payload. The streaming manifest, such as DASH Media Presentation Description (MPD), may provide the URL templates, or a URL template scheme to append the base URLs given in the MPD may be indicated to be applicable. In some embodiments, the streaming manifest may further indicate that the data in the segment payload is tightly packed and in decoding order. The segment payload may refer, for example, to the MediaDataBox. Packing tightly refers to all bytes of the segment payload belonging to the video bitstream, e.g., that the segment payload consists of a contiguous range of bytes of the video bitstream. Such indication may be provided e.g. as a supplemental property in DASH MPD. The video bitstream in the segment payload may be an encapsulated video bitstream. For example, the segment payload may consist of a contiguous set of samples of a video track of an ISOBMFF file.

An Index Segment may be defined as a Segment that primarily contains indexing information for Media Segments. The MPD may provide information indicative of URLs that can be used to obtain Index Segments. Examples of the information follow:
  The RepresentationIndex element within the SegmentBase element specifies the URL including a possible byte range for the Representation Index Segment.

The SegmentList element comprises a number of SegmentURL elements, which may comprise a URL for a Media Segment (in an @media attribute), a byte range within the resource identified by the URL of the @media attribute, a URL for an Index Segment (in an @index attribute), and/or a byte range within the resource identified by the URL of the @index attribute. The URL in the @media attribute in combination with an @mediaRange attribute, if present, specifies the HTTP-URL for the Media Segment. The URL in the @index attribute in combination with an @indexRange attribute, if present, specifies the HTTP-URL for the Index Segment.

The @index attribute of a SegmentTemplate element specifies the template to create the Index Segment List. A segment template comprises a character string from which a list of Segments (identified by their URLs) can be derived. A segment template may comprise specific identifiers that are substituted by dynamic values assigned to Segments, to create a list of Segments.

Each Segment may have assigned Segment Index information that may be provided in an explicitly declared Index Segment. The presence of explicit Index Segment information may be indicated e.g. by any of the following:
  by the presence of one RepresentationIndex element providing the Segment Index for the entire Representation, or
  by the presence of at least one of the two attributes @index and @indexRange in the SegmentList.SegmentURL element, or
  by the presence of SegmentTemplate@index attribute.

The @indexRange attribute may also be used to provide the byte range for an index within a Media Segment, where this is allowed by the Media Segment format. In this case the @index attribute is not present and the range specified lies completely within any byte range specified for the Media Segment. The availability of Index Segments may be identical to the availability to the Media Segments to which they correspond.

It may be preferred that it is possible to fetch all the movie fragment headers of all available tracks with one request per (Sub)segment in order to realize viewport-dependent streaming with late binding efficiently. Availability of the movie fragment headers in the client facilitates HTTP GET requests with byte ranges of coded picture data on picture granularity, thus potentially reducing latency of quality switching. However, currently, there is no solution compatible with DASH signalling or DASH concepts.

First, there is no mechanism in DASH MPD to announce URLs for (Sub)segment headers separately from the respective media data. (Sub)segment headers comprise movie fragment header(s), i.e. MovieFragmentBox(es), and the respective media data may comprise MediaDataBox(es) and/or media data enclosed therein. Second, a late binding approach presented in MPEG document N18235 includes URLs of the media data within the MovieFragmentBox(es) (contained in the DataReferenceBox of the DataInformationBox of the MetaBox), which has the following downsides:
  It is difficult for content delivery over different servers and content delivery networks (CDNs), since the MovieFragmentBoxes need to be changed if the content is moved to a new server or CDN.
  It cannot deal with multi-server/multi-CDN delivery, since only one URL can be used. (In the contrary, DASH MPD can list multiple base URLs for the same content.)

It is incompatible with ISOBMFF, since data references for tracks are carried in the DataReferenceBox of the DataInformationBox of the MediaInformationBox of the MediaBox of the TrackBox. The sample_description_index fields of TrackFragmentHeaderBox and TrackExtendsBox refer to the indexed list of data references given in the DataReferenceBox contained in the TrackBox.

According to the present version of the DASH standard, the (Sub)segment header metadata (e.g., MovieFragmentBoxes) included in the Media Segments of a DASH Representation corresponds to media data included in the same DASH Representation. However, in the late binding case, the metadata should correspond to a superset of the media data that is received, since the metadata describes all available tracks, while only a subset of the media data is received. No mechanism has been presented that handles fetching of (Sub)segment metadata for all available tracks and (Sub)segment media data for a subset of tracks. Therefore, a better mechanism for late binding is needed.

In some embodiments, an encoder may obtain a file or Initialization and media segment(s) with tile tracks. The encoder may encode each tile track into a representation, and each set of representations of collocated tile tracks into an adaptation set. The encoder may generate Index Segment(s) comprising Segment metadata for the tile tracks. For a base track, the encoder may also obtain a file or initialization and Media Segment(s) including tile base track(s). The encoder may encode a tile base track into a Representation, and encode the representation into an adaptation set of its own. After the Representation and Adaptation set are encoded, the encoder may proceed to media presentation description and segment authoring.

In some embodiments, the encoder may encode information indicative of the URL(s) of Index Segment(s) into the MPD. In some embodiments, the encoder may encode information indicative of the URL(s) of the Media Segment(s) specific to individual Representations into the MPD. The Index Segment(s) may also comprise information for the tile base track(s). Information indicative of the URL(s) of Media Segment(s) specific to the Representation(s) for the tile base track(s) may also be encoded into the MPD. Several versions, e.g. of different bitrate, of collocated tile tracks may be handled by encoding in the file or in the Initialization Segment(s) information indicative of track groups, such that each set of collocated tile tracks forms a track group (e.g. of type 'alte'); and referencing a track group from a track reference from a tile base track. Referencing a track group implies that one track from the track group is to be selected for reconstructing a bitstream on the basis of the tile base track.

FIG. 6 illustrates the process of media presentation description and segment authoring performed by, for example, an encoder embodied by apparatus 10 of FIG. 1. As illustrated in block 60, an apparatus, such as apparatus 10 of FIG. 1, includes means, such as the processing circuitry 12, for encoding, into a media description, a first information item indicative of a first locator for segment metadata for a set of representations. In some embodiments, the first information item comprises information identifying Index Segment(s) for ISOBMFF-based Media Segments. The Index Segment(s) describe one or more segments of a collection of tracks, e.g. segments in all tile tracks of a particular media content, and potentially also the respective tile base track(s). In some embodiments, the media description complies with DASH MPD.

As illustrated in block 62, an apparatus, such as apparatus 10 of FIG. 1, includes means, such as the processing circuitry 12, for encoding, into the media description, one or more representation-specific information items indicative of representation-specific locator(s) for segment media data for one or more representations of the set of representations. In some embodiments, in the MPD, information indicative of the adaptation set containing the tile base track to be the main adaptation set of a Preselection are also encoded. In some embodiments, in the MPD, the information indicative of adaptation sets and representations containing tile tracks to be included in the preselection are also encoded. In some embodiments, information indicative of that index segment(s) for an adaptation set of a preselection (e.g., for the main adaptation set of a preselection) describes the tracks carried in the representations of the adaptation Sets of the same preselection is also encoded in the MPD. Additional indication may be included in the MPD to indicate that the index segment covers the entire preselection, rather than just the representation of the main adaptation set. In some embodiments, the representation-specific information item comprises information identifying Media Segment(s) for ISOBMFF-based Media Segments. In some embodiments, the ISOBMFF-based Media Segment(s) comprise media data without ISOBMFF metadata. In some embodiments, the ISOBMFF-based Media Segment(s) comprise IdentifiedMediaDataBox(es) of ISOBMFF.

As illustrated in block 64, an apparatus, such as apparatus 10 of FIG. 1, includes means, such as the processing circuitry 12 and the memory 14, for causing storage of the media description with the set of representations.

In some embodiments, the segment metadata comprise movie fragment headers, e.g., MovieFragmentBox(es), and may comprise zero or more of the following: SegmentTypeBox(es), SegmentIndexBox(es), SubsegmentIndexBox(es), and/or ProducerReferenceTimeBox(es).

FIGS. 7A and 7B illustrate example Index Segments and Media Segments that may be utilized in conjunction with, by way of example, DASH live-service utilization. By way of example, consider a presentation with 2 sub-pictures as different adaptation sets, each adaptation set has 2 representations, characterized as follows:

DASH Period
    Adaptation_set_1
        Representation_1 (carries tile track Track_1)
        Representation_2 (carries tile track Track_2)
    Adaptation_set_2
        Representation_3 (carries tile track Track_3)
        Representation_4 (carries tile track Track_4)
    Adaptation_set_3
        Representation_5 (carries the tile base track Track_5)

The Index Segments for the example presentation are illustrated in FIG. 7A. The Media Segments for the example presentation are illustrated in FIG. 7B. Each illustrated 'imda' box is encapsulated in a separate Media Segment having a URL that can be derived from the MPD. Movie fragment sequence numbers may be unique and may be used as identifiers within IdentifiedMediaDataBoxes. In Initialization Segments, DataEntrySeqNumImdaBox is included among the data reference entries. TrackFragmentHeaderBoxes and/or TrackExtendsBoxes use a sample description entry that references the data reference entry of DataEntrySeqNumImdaBox. Track identifier values are also unique.

In an embodiment, the semantics of reference_type of SegmentIndexBox are specified as follows: reference_type equal to 1 indicates that the reference is to a SegmentIndexBox or a MovieFragmentBox (contained in the same Segment as the SegmentIndexBox containing the reference type). reference_type equal to 0 indicates that the reference is to the start of the first box (such as IdentifiedMediaDataBox or MediaDataBox) of the referenced Subsegment within the Media Segment (that may not contain MovieFragmentBoxes). Alternatively, it may be specified that reference_type equal to 0 indicates that the reference is to the start of the first media data box (such as IdentifiedMediaDataBox or MediaDataBox) of the referenced Subsegment within the Media Segment regardless of whether the first media data box of the Subsegment is the first box of the Subsegment. The above-described semantics of reference_type may be conditionally used by a file writer and/or a file reader and/or another entity, wherein the condition may be, but is not limited to, one or more of the following:

The SegmentIndexBox containing reference_type is included in an Index Segment.
    A pre-defined flag in the box header flags of SegmentIndexBox is equal to 1.
    A pre-defined version (or range of version values) in the box header of SegmentIndexBox.
    A pre-defined brand is included in the FileTypeBox and/or in the TrackTypeBox.

In an embodiment, when the above-described condition is not fulfilled, a file writer and/or a file reader and/or another entity uses the semantics of reference_type as presently specified in ISOBMFF and as described elsewhere in this document.

In an embodiment, a file writer or another entity creates an Index Segment with SegmentIndexBox(es) and MovieFragmentBox(es), and includes reference_type equal to 1 in a SegmentIndexBox pointing to a MovieFragmentBox in the Index Segment.

In an embodiment, a file reader or another entity parses an Index Segment entirely or partially. As a part of said Index Segment parsing, the file reader or another entity parses a reference_type equal to 1 from a SegmentIndexBox contained in the Index Segment, wherein the reference type equal to 1 points to a MovieFragmentBox in the Index Segment. In an embodiment, a file reader or another entity concludes or estimates which instances of reference type equal to 1 point to a SegmentIndexBox and which ones point to a MovieFragmentBox. This conclusion may be reached based on knowledge (e.g. a requirement in a standard, or a parsed indication) that all SegmentIndexBoxes precede all MovieFragmentBoxes in an Index Segment. Thus, by concluding or estimating the reference to the last SegmentIndexBox or the first MovieFragmentBox within an Index Segment, it can be known that the subsequent references are all to the MovieFragmentBoxes. For example, a file reader or another entity may parse references in their appearance order within an Index Segment until the first MovieFragmentBox is found. Consequently, a file reader or another entity may select a subset of MovieFragmentsBoxes to be requested and/or processed. Thus, only the selected MovieFragmentBoxes of the Index Segment may be fetched and thus less bitrate may be used for fetching the Index Segment.

When a Media Segment contains more than one IdentifiedMediaDataBox, e.g. one per Sub-Segment, a DASH client might issue a byte range request for a subset of IdentifiedMediaDataBoxes (e.g. certain Sub-Segments only) or even for a part of one particular IdentifiedMediaDataBox (e.g. certain coded pictures starting from a random-access picture only). In this regard, an example embodiment is configured to indicate (in the content authoring) and/or resolve (in the client) byte range(s) for individual IndentifiedMediaDataBoxes include:

1. A SegmentIndexBox having a referenced size with reference_type equal to 0 indicates the size of the 'imda' box for each Subsegment. FIG. 8 illustrates option 1 graphically. The example illustrated in FIG. 8 may be utilized in conjunction with DASH on-demand profile utilization.
   a. In some embodiments, Segments are authored to obey a constraint that a loop entry with reference type equal to 0 may be immediately preceded by a loop entry with reference type equal to 1 and that loop entry may point to a 'moof' box (or some other box other than 'sidx' that may start the metadata for a Subsegment). In some embodiments, parsing takes advantage of the constraint to conclude which references of the 'sidx' box point to a 'moof' box.
2. An indication of a byte range index of the Media Segment separately, by way of example, by using any of the following syntax structures:
   a. A BoxFileIndexBox (fidx) included in the Index Segment format to indicate the structure of the respective (time-aligned) Media Segment.
      Because Media Segments of different Representations may or may not be included in different files/resources (e.g., different URLs may be used for fetching them), the association of the BoxFileIndexBox with the correct Media Segment should be clear. This could be done, by way of example with either one of the following approaches:
      i. A new container box for the 'fidx' box is defined and carries the track ID(s) carried in the associated Media Segment:

```
aligned(8) class MediaSegmentContentsBox
extends FullBox('mstc', version, flags) {
   TrackIdBox track_id_list; // optional
      // If present, defines the tracks for which this fidx box
applies.
      // If not present, this box applies to all tracks.
   BoxFileIndexBox table_of_boxes; // box index of the associated
Media Segment
}
aligned(8) class TrackIdBox extends FullBox('trid', version, flags)
{
   unsigned int(32) num tracks;
   for (i=0; i<num tracks; i++)
      track id[i]; // track IDs for the tracks
   }
}
``` ii. The box order may specify the association. For example, the BoxFileIndexBox may be associated with the immediately following 'sidx' or 'moof' box and may describe the file that carries the track described by the associated 'sidx' or 'moof' box.
      The absence of BoxFileIndexBox may be specified to indicate that Media Segments carry a single 'imda' box
   b. A (new) byte range box included as a child box of the 'moof' box or next to the 'moof' box. The byte range box may include the byte range and/or size of all 'imda' boxes.
   c. A BoxIndexBox included as a child box of the 'moof' box or next to the 'moof' box; define its semantics to indicate the box index of the respective Subsegment of the Media Segment.
d. Offsets and/or byte ranges and/or byte counts for MovieFragmentBoxes and media data boxes (e.g. IdentifiedMediaDataBoxes) indicated separately in the SegmentIndexBox.

In an embodiment falling to category d above, the following is specified for SegmentIndexBox: A pre-defined flag in the box flags of SegmentIndexBox is specified, when equal to 1, to indicate that an offset or a byte range or a byte count for media data is present in the SegmentIndexBox for each entry having reference_type equal to 0 in the SegmentIndexBox. Another pre-defined flag or the same flag in the box flags of SegmentIndexBox is specified, when equal to 1, to indicate that the offset or the byte range of the byte count for media data is relative to a different resource (e.g. a Media Segment without SegmentIndexBoxes or MovieFragmentBoxes) than that containing the SegmentIndexBox. For example, the following syntax may be used:

```
aligned(8) class SegmentIndexBox extends FullBox('sidx', version, flags)
{
   unsigned int(32) reference_ID;
   unsigned int(32) timescale;
   if (version==0) {
      unsigned int(32) earliest_presentation_time;
      unsigned int(32) first_offset;
   }
   else {
      unsigned int (64) earliest_presentation_time;
      unsigned int(64) first_offset;
   }
   unsigned int(16) reserved = 0;
   unsigned int(16) reference_count;
   for(i=1; i <= reference_count; i++)
   {
      bit (1)           reference_type;
      unsigned int(31)  referenced_size;
      unsigned int(32)  subsegment_duration;
      bit (1)           starts_with_SAP;
      unsigned int(3)   SAP_type;
      unsigned int(28)  SAP_delta_time;
   }
   if (flags & 1)
      for(i=1; i <= reference count; i++)
         if (reference type == 0) // reference type of the same i value
            unsigned int(32) media_data_offset;
}
``` media_data_offset specifies the offset to the start of the referenced MediaDataBox or IdentifiedMediaDataBox of a subsegment. If (flags & 8) is equal to zero, the offset is relative to the start of the subsegment, i.e. the MovieFragmentBox indicated by the respective reference_type equal to 0 in the first loop of the SegmentIndexBox. Otherwise, the offset is relative to the start of the Media Segment containing the referenced MediaDataBox or IdentifiedMediaDataBox. The offset may be indicated in units of bytes. It needs to be understood that while the embodiment was described above with reference to an offset, it could likewise be applied to a byte range by including a byte count or an end offset in addition to the offset in the syntax. Likewise, the embodiment could likewise be applied to a byte count instead of an offset, and consequently a file reader or another entity may derive an offset as a sum of prior offsets (in the same loop).

If option 1 is utilized, a client device including a decoder may be configured to fetch the initial part of the Index Segment (containing 'sidx' boxes). Because the Index Segment is interleaved on a Subsegment basis, it can be requested Subsegment by Subsegment using byte ranges (found from 'sidx' boxes). The client device may be further configured to fetch selected Subsegment(s) of selected Media Segment(s), for which byte range(s) of the respective 'imda' boxes are obtained from references with reference_type 0 included in the respective 'sidx' box.

It should be understood that since URLs of Media Segment(s) are indicated separately from URLs of Index Segment(s) in the MPD, they reside in different files or resources logically. Thus, segment headers carried in the Index Segment(s) reside logically in different files from the media data. Consequently, entries with reference type 1 in SegmentIndexBoxes are in the Index Segment, and entries with reference type 0 are in the Media Segment with byte offsets indicated in SegmentIndexBoxes relative to the Media Segment itself. Since DASH MPD allows to use byte ranges with HTTP URLs, Index Segment(s) and MediaSegment(s) may physically reside in the same file, and merely have different byte ranges indicated in the MPD. However, even in this case, the Index Segment(s) and Media Segment(s) are logically in different files or resources, and the interpretation of the offsets provided in the SegmentIndexBoxes remains the same.

Such embodiments have been described above where one or more SegmentIndexBoxes are present per track. Such track-specific SegmentIndexBoxes might be unnecessary, since all tile tracks and the tile base track typically share the same properties, such as SAP locations. Byte count saving might be achieved by avoiding track-specific SegmentIndexBoxes. Moreover, track-specific SegmentIndexBoxes may require constraints, e.g. in a standard, for ordering and/or interleaving of SegmentIndexBoxes of different tracks. According to an embodiment, tracks share the same one or more SegmentIndexBox(es) with the following arrangement:

Sub-Representations are used, each Sub-representation corresponding to a different track.

SubsegmentIndexBoxes are present in the segment header (next to the corresponding SegmentIndexBoxes that index media data).

A LevelAssignmentBox is present in an Initialization Segment and indicates assignment of levels on track basis, i.e. a mapping from features indicated for the level to an indicated track.

Consequently, there may be a single Representation for a tile base track and all tile tracks referenced by the tile base track. When a tile base track comprises a track reference to a track group (e.g. of type 'alte'), different versions of collocated tile tracks (e.g. differing in bitrate and/or quality) may be present in a single Representation.

In an embodiment, there is a single MovieFragmentBox present per each Subsegment, and the MovieFragmentBox comprises a TrackFragmentBox for each track in the Representation. A client may resolve the byte range for the IdentifiedMediaDataBox corresponding to the MovieFragmentBox as described in other embodiments, or may conclude that an entire resource (identified by a URL) corresponds to the IdentifiedMediaDataBox. The client determines which tracks are received e.g. based on the current viewport and concludes the corresponding Sub-Representations, levels, and tracks. The byte offsets in the TrackFragmentBoxes of the selected tracks are relative to the start of the IdentifiedMediaDataBox corresponding to the MovieFragmentBox. Thus, the byte offsets in the TrackFragmentBoxes can be used in relation to the URL and the potential starting byte offset of the byte range for the IdentifiedMediaDataBox to determine which byte ranges are requested to fetch the media data of the selected tracks.

In some embodiments, instead of using IdentifiedMediaDataBox(es), a new new type of data reference: "externally provided URL" may be defined and used. The files cannot be processed without this URL being given to the file reader. The given URL may change on track fragment basis. ISOBMFF-based Media Segment may be such that it only contains the MediaDataBox(es), IdentifiedMediaDataBox(es), or media data not encapsulated in box(es). The Media Segment type, profile, or such may indicate which type of a Media Segment is in use. Media Segment URLs may be identified from the MPD and given to the file reader. The file reader may apply the byte offsets obtained from the SegmentIndexBox(es) and/or MovieFragmentBox(es) relative to the start of the resource identified by the URL given to the file reader. Entries with reference type 0 in the SegmentIndexBox may be specified to be in the media file, e.g., the resource identified by the URL given to the file reader.

In some embodiments, an Index Segment is identified by a specific four-character code included in the SegmentTypeBox ('styp') in the Index Segment In some embodiments, a Media Segment according other embodiments is identified by a specific four-character code included in the SegmentTypeBox ('styp') in the Media Segment. A receiver, file reader, or alike may identify that it needs to process the Segment(s) as described in other embodiments based on received specific four-character codes for the SegmentTypeBox.

In some embodiments, an Index Segment format is specified as follows, but it needs to be understood that other similar embodiments on Index Segment format could be likewise created with features described in other embodiments. Each Index Segment may be required to begin with a 'styp' box, and a specific brand, e.g. 'sibm', may be required be present in the 'styp' box. An Index Segment of this format are arranged as follows: All SegmentIndexBoxes precede all MovieFragmentBoxes. When an Index Segment describes several tracks, Subsegments of all tracks are aligned, and all MovieFragmentBoxes of the same aligned Subsegment are contiguous in the Index Segment, i.e. not interleaved by any MovieFragmentBox of any other Subsegment. MovieFragmentBoxes of each track appear in increasing time order. MovieFragmentBoxes use sample entries that reference DataEntrySeqNumImdaBox. Index Segments are either associated with a single Media Segment or with all Media Segments. An Index Segment may contain SubsegmentIndexBoxes. Index Segments for a Representation of a main Adaptation Set of a Preselection provides a Segment Index for all Representations of the Preselection.

In an embodiment, a file writer or another entity writes the Index Segment in a manner that the same track is or the same tracks are consistently described in the first MovieFragmentBox of each Subsegment of the Index Segment. Thus, when the SegmentIndexBox ('sidx') is used to describe Subsegments, referenced size (in a 'sidx' box) applying to the first MovieFragmentBox of a Subsegment indicates the collective size of all MovieFragmentBoxes of the Subsegment. In an embodiment, a file writer or another entity indicates in the file (e.g. with a pre-defined box flag equal to 1 in SegmentIndexBox) or along the file (e.g. in MPD) that the same track is or the same tracks are consistently described in the first MovieFragmentBox of each Subsegment of the Index Segment.

In an embodiment, a file reader or another entity concludes that the same track is or the same tracks are consistently described in the first MovieFragmentBox of each Subsegment of the Index Segment. In an embodiment, said concluding is based on reading an indication from the file (e.g. from a pre-defined box flag equal to 1 in SegmentIndexBox) or along the file (e.g. from MPD) that the same track is or the same tracks are consistently described in the first MovieFragmentBox of each Subsegment of the Index Segment. In an embodiment, it is pre-defined e.g. in a standard that the same track is or the same tracks are consistently described in the first MovieFragmentBox of each Subsegment of the Index Segment, and hence said concluding is based on concluding that a file, or a Representation, or alike conforms to the standard (or alike) where the pre-definition has been made. In an embodiment, having concluded that that the same track is or the same tracks are consistently described in the first MovieFragmentBox of each Subsegment of the Index Segment, a file reader or another entity issues a single HTTP GET request with the byte range derived from referenced_size bytes to fetch all MovieFragmentBoxes of a Subsegment. Thus, multiple byte ranges need not be concluded or requested by the file reader or another entity to fetch all MovieFragmentBoxes of a Subsegment.

In some embodiments, an Index Segment format is specified as follows, but it needs to be understood that other similar embodiments on Index Segment format could be likewise created with features described in other embodiments. Each Media Segment may be required to begin with a 'styp' box, and a specific brand, e.g. 'imds', may be required be present in the 'styp' box. A Media Segment of this format contains media data in one or more IdentifiedMediaDataBoxes (and containing media data in other boxes may be disallowed).

FIG. 9A and 9B illustrate the process of client device operation performed by, for example, a playback device embodied by apparatus 10 of FIG. 1. As illustrated in block 902 of FIG. 9A, an apparatus, such as apparatus 10 of FIG. 1, includes means, such as the processing circuitry 12 and the communication interface 16, for receiving information indicating that byte offsets in segment or subsegment metadata to segment or subsegment media data are relative to a box containing the segment or subsegment media data. In an embodiment, said information comprises a data reference to identified media data box(es). In an embodiment, said information comprises an Initialization Segment including a DataReferenceBox including a data reference that is specified to an identified media data box. The data reference may for example be DataEntryImdaBox, DataEntryTfdtBasedImdaBox, DataEntrySeqNumImdaBox, or alike.

As illustrated in block 904 of FIG. 9A, the apparatus includes means, such as the processing circuitry 12 and the communication interface 16, for receiving segment or subsegment metadata for a collection of tracks. In an embodiment, the segment or subsegment metadata for a collection of tracks comprises an Index Segment.

As illustrated in block 906 of FIG. 9A, an apparatus, such as apparatus 10 of FIG. 1, includes means, such as the processing circuitry 12, for determining a locator for the segment or subsegment media data, such as by parsing the segment or subsegment media data. In an embodiment, the locator for segment or subsegment media data is an HTTP URL for a Media Segment, which is determined from DASH MPD.

As illustrated in block 908 of FIG. 9A, the apparatus includes means, such as the processing circuitry 12, for determining whether a byte range is needed in addition to the locator to request segment or subsegment media data. In an embodiment, the Index Segment comprises information of multiple subsegments and their byte ranges. Thus, the byte range concluded from the Index Segment is needed in addition to the locator (e.g. HTTP URL) to request subsegment media data.

As illustrated in block 910 of FIG. 9B the apparatus includes means, such as the processing circuitry 12, for determining, from the segment or subsegment metadata, one or more byte ranges for the respective segment or subsegment media data individually for the collection of tracks in a circumstance where a byte range is needed, for example, by parsing a byte range box.

As illustrated in block 912 of FIG. 9B, the apparatus includes means, such as the processing circuitry 12, for selecting a subset of tracks from the collection of tracks.

As illustrated in block 914 of FIG. 9B, the apparatus includes means, such as the processing circuitry 12 and the communication interface 16, for receiving segment or subsegment media data for the selected subset of tracks through requests with the respective locator.

As illustrated in block 916 of FIG. 9B, the apparatus includes means, such as the processing circuitry 12, for parsing the segment or subsegment metadata of the subset of tracks to obtain decapsulated media data suitable for decoding the segment or subsegment media data.

The client may iteratively perform the operations in FIGS. 9A and 9B for time-aligned Index and Media Segments and the operations of fetching an Index Segment and selecting representations or tracks from which Media Segment(s) are requested and received. The client device may also concatenate the Index Segment and the received Media Segments and pass the concatenated Segments for file parsing and subsequently for decoding (such as 914 and 916). Such concatenation is possible thanks to the byte offsets derived from MovieFragmentBox(es) being relative to the start of IdentifiedMediaDataBox(es), thus not being affected by which boxes are present in the concatenated Segments and or which concatenation order is used.

FIGS. 10A and 10B are graphical illustrations of the Index and Media Segments used in the operations of the client devices. The Index and Media Segments may be used in conjunction with, by way of example, DASH live-service utilization. FIG. 10A illustrates the requesting, fetching, and selection operations and FIG. 10B illustrates the reconstructed concatenated files.

'moof' boxes that do not have respective 'imda' boxes present may be removed. The order of the 'moof' boxes and 'imda' in the concatenated file may be arranged based on the content creator's choice, as long as an 'imda' box come after the related 'moof' box in the concatenated file.

Embodiments have been described in relation to viewport-dependent streaming of 360-degree 3DoF video with late binding. It needs to be understood that embodiments are not limited to 360-degree video or to viewport-dependent streaming. In an embodiment, the representations could include media/meta data related to 6DoF video, overlays, viewpoints, or point cloud data. In another embodiment, any 2D video media with tiling, with or without a 2D/3D projection may be streamed by utilizing representations and adaptation sets as defined above. A player with adaptive bitrate logic will make use of the segments for deciding which segment to download.

FIG. 11 illustrates the process of media presentation description and segment authoring performed by, for example, an encoder embodied by apparatus 10 of FIG. 1. As illustrated in block 110, an apparatus, such as apparatus 10 of FIG. 1, includes means, such as the processing circuitry 12 and communication interface 16, for receiving a file or an initialization segment and one or more media segments with one or more tile tracks.

As illustrated in block 112, the apparatus includes means, such as the processing circuitry 12, for encoding the one or more tile tracks in a representation.

As illustrated in block 114, the apparatus includes means, such as the processing circuitry 12, for separating segment metadata and segment media data to separate parts of the media segment for each of the one or more media segments.

As illustrated in block 116, the apparatus includes means, such as the processing circuitry 12, for ordering segment metadata in subsegment-interleaved order within media segment for each of the one or more media segments.

The apparatus may further include means, such as the processing circuitry 12, for indicating byte ranges for Subsegment- and track-wise of media data within each of the one or more media segments. FIG. 12 illustrates an example media segment that may be utilized in conjunction with DASH on-demand service utilization. In the illustrated example, 'imda' boxes are interleaved on track basis. This may be preferred when several consecutive Subsegments of a track are requested with one request. Another option is to interleave 'imda' boxes on Subsegment basis. In order to determine byte ranges corresponding to 'imda' boxes to be requested with a byte-range request, similar options exist as with certain Index Segment based embodiments. The options include at least:

1. Include a BoxFileIndexBox at the beginning of the Media Segment. The BoxFileIndexBox describes (e.g. provides sizes of) the top-level boxes of the Media Segment.
2. Include a (new) byte range box ('byra') as a child box of the 'moof' box or next to the 'moof' box
3. Extend the SegmentIndexBox with a byte range of the 'imda' box associated with the 'moof' box referenced by the 'sidx' box (i.e., for references with reference_type 0)
4. A new box 'First Data Box Offset' (fdbo) is also defined: fdbo is put before the first sidx box in order to indicate the byte offset of the first 'imda' box. This enables progressive download of segment headers (comprising sidx and moof boxes) and imda boxes. In addition, sizes or byte ranges of 'imda' boxes are indicated with any method above. An example data structure for FirstDataBoxOffsetBox may be as follows:

```
aligned(8) class FirstDataBoxOffsetBox
extends FullBox('fdbo', version, flags) {
   unsigned int(32) first_data_box_offset; //byte offset of first 'imda' box
}
```

FIG. 13 illustrates an example byterange box that may be utilized in conjunction with DASH on-demand service utilization. After receiving a (Sub)segment and before parsing the (Sub)segment, information on byte ranges related to 'imda' boxes may be rewritten or removed, since only a subset of 'imda' boxes are received. For example, the BoxFileIndexBox may be updated to describe only the received boxes with correct byte ranges.

Embodiments have been described with reference to the 'imda' box (i.e. IdentifiedMediaDataBox). It should be understood that embodiments could be realized with other types of media data boxes or media data that is not carried in box structures. A downside of such realizations is that some side information might be needed for correcting the byte offsets from the segment headers to the media data, since the byte offsets that are originally included in the media segments may assume that all media data is received, while actually media data is only partially received.

Embodiments have been described with reference to tile tracks and tile base tracks. It needs to be understood that embodiments could be similarly realized with other similar concepts, such as sub-picture tracks and extractor tracks rather than tile tracks and tile base tracks, respectively.

Embodiments have been described with reference to tiles or MCTSs. It needs to be understood that embodiments could be similarly realized with other similar concepts. For example, in draft H.266 standard (a.k.a. Versatile Video Coding), a subpicture is a rectangular region consisting of an integer number of complete slices, and the boundaries of a subpicture may be treated like picture boundaries, i.e. in the (de)coding process any references to sample locations outside a subpicture boundary may be saturated in the (de)coding process to use the closest sample location on the subpicture boundary.

Embodiments have been described in relation to specific syntax. It should be understood that embodiments apply similarly to other syntax with the same or similar functionality.

Embodiments have been described in relation to specific syntax. It should be understood that embodiments apply to an entity writing such syntax. For example, where an embodiment is described in relation to file format syntax, embodiments also apply to a file writer creating a file or segment(s) according to the file format syntax. Similarly, embodiments apply to an entity reading such syntax. For example, where an embodiment is described in relation to file format syntax, embodiments also apply to a file reader parsing or processing a file or segment(s) according to the file format syntax.

An example embodiment of the invention described above describes the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe certain embodiments performed by a codec within an apparatus, it would be appreciated that other embodiments may be implemented as part of any video codec. Thus, for example, certain embodiments may be implemented in a video codec which may implement video coding over fixed or wired communication paths.

As described above, FIGS. 6, 9A, 9B, and 11 include flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 6, 9A, 9B, and 11. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines in FIGS. 2-4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contem- That which is claimed:

1. A method comprising:
encoding, into a media description, a first information item configured to identify a segment metadata associated with a set of representations, wherein the segment metadata is configured to indicate one or more index segments of one or more media segments;
encoding, into the media description, one or more representation-specific information items indicative of a representation-specific locator for a respective segment media data for a respective representation of the set of representations; and
causing storage of the media description with the set of representations.

2. A method according to claim 1, wherein the one or more index segments describe one or more segments of a collection of tracks, wherein respective ones of the one or more index segments describe respective ones of the one or more media segments of the set of representations.

3. A method according to claims 1, wherein the segment metadata comprises one or more movie fragment headers.

4. The method of claim 1, wherein the representation-specific locator comprises a uniform resource locator for a media segment.

5. The method of claim 1, wherein the index segment is configured to configured to index, at least, a byte range of the respective segment media data.

6. The method of claim 1, wherein the respective segment media data comprises at least one sample of a video track of an ISO base media file format file.

7. The method of claim 1, wherein the first information item comprises at least one of:
a uniform resource locator associated with the segment metadata, or
a byte range associated with the segment metadata.

8. The method of claim 1, wherein the media description is according to a dynamic adaptive streaming over hypertext transfer protocol format.

9. The method of claim 2, wherein the collection of tracks comprises, at least, a tile base track and one or more tile tracks referenced by the tile base track.

10. An apparatus comprising
at least one processor and
at least one non-transitory memory including computer program code for one or more programs, the at least one memory and the computer program code configured to, with the at least one processor, cause the apparatus at least to:
encode, into a media description, a first information item configured to identify a segment metadata associated with a set of representations, wherein the segment metadata is configured to indicate one or more index segments of one or more media segments;
encode, into the media description, one or more representation-specific information items indicative of a representation-specific locator for a respective segment media data for a respective representation of the set of representations; and
cause storage of the media description with the set of representations.

11. An apparatus according to claim 10, wherein the one or more index segments describe one or more segments of a collection of tracks, wherein respective ones of the one or more index segments describe respective ones of the one or more media segments of the set of representations.

12. An apparatus according to claim 10, wherein the segment metadata comprises one or more movie fragment headers.

13. The apparatus of claim 12, wherein the one or more movie fragment headers are configured to indicate that data references are relative to media data boxes identified by move fragment sequence numbers.

14. The apparatus of claim 10, wherein the representation-specific locator comprises a uniform resource locator for a media segment.

15. The apparatus of claim 10, wherein the index segment is configured to configured to index, at least, a byte range of the respective segment media data.

16. The apparatus of claim 10, wherein the respective segment media data comprises at least one sample of a video track of an ISO base media file format file.

17. The apparatus of claim 10, wherein the first information item comprises at least one of:
a uniform resource locator associated with the segment metadata, or
a byte range associated with the segment metadata.

18. The apparatus of claim 10, wherein the media description is according to a dynamic adaptive streaming over hypertext transfer protocol format.

19. The apparatus of claim 11, wherein the collection of tracks comprises, at least, a tile base track and one or more tile tracks referenced by the tile base track.

20. A non-transitory computer-readable medium comprising program instructions stored thereon for performing at least the following:
encoding, into a media description, a first information item configured to identify a segment metadata associated with a set of representations, wherein the segment metadata is configured to indicate one or more index segments of one or more media segments;
encoding, into the media description, one or more representation-specific information items indicative of a representation-specific locator for a respective segment media data for a respective representation of the set of representations; and
causing storage of the media description with the set of representations.

* * * * *